United States Patent
Morimoto et al.

[11] Patent Number: 5,832,105
[45] Date of Patent: Nov. 3, 1998

[54] METHOD AND APPARATUS USING A ZERO-POINT CROSSING OF QUADRATICALLY DIFFERENTIATED INTENSITY DATA IN A HISTOGRAM TO DETERMINE A THRESHOLD FOR DETECTING A COMPONENT FROM BACKGROUND

[75] Inventors: Masamichi Morimoto, Moriguchi, Japan; Ömür Bozma, Istanbul, Turkey; Junichi Hada, Katano, Japan

[73] Assignee: Matsushita Electric Industrial Co., Ltd., Osaka-fu, Japan

[21] Appl. No.: 753,680

[22] Filed: Nov. 27, 1996

[30] Foreign Application Priority Data

Nov. 30, 1995 [JP] Japan .................................. 7-311475

[51] Int. Cl.$^6$ ........................................................ G06K 9/00
[52] U.S. Cl. ........................ 382/151; 382/171; 382/172
[58] Field of Search ................................. 382/151, 141, 382/172, 171, 170, 168, 173, 270; 358/466

[56] References Cited

U.S. PATENT DOCUMENTS 5,091,967  2/1992  Ohsawa .................................. 382/172
5,659,402  8/1997  Fujita et al. .......................... 358/466
5,699,454  12/1997  Nakai et al. .......................... 382/172

*Primary Examiner*—Scott Rogers
*Attorney, Agent, or Firm*—Wenderoth, Lind & Ponack, L.L.P.

[57] ABSTRACT

In a component detecting method and apparatus, intensity data stored in an intensity data storing device are rearranged in order of increasing intensity data. An intensity data quadratic differential table is formed by quadratically differentiating the intensity data of an intensity profile with respect to a data number of the intensity data. The data number at a zero-crossing point at which a quadratic differential data obtained by quadratically differentiating the intensity data is changed between positive and negative through zero from the intensity data quadratic differential table is detected. A threshold value is determined according to the intensity data of the intensity profile corresponding to the data number at the zero-crossing point. So, the component detect method and apparatus can detecting an image of the component from a background with the appropriate threshold value even when the component to be recognized is dirty or the intensity of the background fluctuates

14 Claims, 23 Drawing Sheets

Fig.5

| SAMPLING NUMBER | INTENSITY DATA |
|---|---|
| 0 | 1 |
| 1 | 2 |
| 2 | 1 |
| 3 | 3 |
| 4 | 1 |
| 5 | 3 |
| 6 | 8 |
| 7 | 5 |
| 8 | 9 |
| 9 | 2 |
| 10 | 2 |
| 11 | 9 |
| 12 | 4 |
| 13 | 9 |
| 14 | 3 |
| 15 | 1 |
| 16 | 2 |
| 17 | 1 |
| 18 | 0 |
| 19 | 1 |

Fig.7

| DATA NUMBER | INTENSITY DATA |
|---|---|
| 0 | 0 |
| 1 | 1 |
| 2 | 1 |
| 3 | 1 |
| 4 | 1 |
| 5 | 1 |
| 6 | 1 |
| 7 | 2 |
| 8 | 2 |
| 9 | 2 |
| 10 | 2 |
| 11 | 3 |
| 12 | 3 |
| 13 | 3 |
| 14 | 4 |
| 15 | 5 |
| 16 | 8 |
| 17 | 9 |
| 18 | 9 |
| 19 | 9 |

Fig.9

| DATA NUMBER | QUADRATIC DIFFERENTIAL DATA |
|---|---|
| 0 | 1 |
| 1 | −1 |
| 2 | 0 |
| 3 | 0 |
| 4 | 0 |
| 5 | 0 |
| 6 | 1 |
| 7 | −1 |
| 8 | 0 |
| 9 | 0 |
| 10 | 1 |
| 11 | −1 |
| 12 | 0 |
| 13 | 1 |
| 14 | 0 |
| 15 | 2 |
| 16 | −2 |
| 17 | −1 |
| 18 | 0 |
| 19 | 0 |

METHOD AND APPARATUS USING A ZERO-POINT CROSSING OF QUADRATICALLY DIFFERENTIATED INTENSITY DATA IN A HISTOGRAM TO DETERMINE A THRESHOLD FOR DETECTING A COMPONENT FROM BACKGROUND

BACKGROUND OF THE INVENTION

1. Field of the Invention

The present invention relates to a component detecting method and apparatus for detecting an image of the component from a background with a threshold value. The component detecting method is executed in an electronic component mounting apparatus which has a nozzle for picking up an electronic component via suction and mounting the electronic component at a mounting position on a circuit board, and used for specifying an image of the electronic component picked up by the nozzle through digital image processing. Namely, the threshold value in the digital image processing is a value for distinguishing between a light portion and a dark portion such as an object to be recognized and a non-object, for example the electronic component and the background.

2. Conventional Art

An electronic component mounting apparatus is well known, which mounts an electronic component automatically at a mounting position on a circuit board. In such electronic component mounting apparatus, the electronic component to be mounted is suctioned by a nozzle and a mounting operation is executed by moving the nozzle having the electronic component toward the mounting position. In this mounting operation, the suctioned electronic component can be mounted at the mounting position accurately by moving the nozzle with a transferring distance such that a central position of a sucking opening of the nozzle is fitted at the mounting position.

However, when the nozzle suction the electronic component, the central position of the sucking opening of the nozzle does not always set at a central position of the electronic component. Furthermore, a posture of the suctioned electronic component is inclined on a plane as shown by the solid line in FIG. 30 with respect to the correct posture of the suctioned electronic component as shown by the dotted line in FIG. 30. Accordingly, it is necessary to calculate the central position and an inclination of the suctioned electronic component for in order to compensate a difference of the central position and the posture of the suctioned electronic component, and then based on this calculated result, correct the transferring distance and the posture of the suctioned electronic component. In order to execute the correction, a detection of the central position and the posture of the electronic component suctioned by the nozzle is executed before mounting the suctioned electronic component on the circuit board. In the detection, first, the suctioned electronic component is illuminated and then reflected light from the suctioned electronic component is detected by an image pickup device. An outputted image signal from the image pickup device represents a gray image, and includes an image signal of the electronic component and an image signal of background, and then is digitized. So, it is necessary to select an image signal of the electronic component from the digitized signal. Regarding a method for the selection, it is known to use a threshold value for distinguishing the image signal of the electronic component from the image signal of background. The method using the threshold value for detecting the component in the image processing of the gray image in the conventional art will be described with reference to FIGS. 25 and 26.

FIG. 25 shows a gray image pattern 102 comprised of a gray image pattern 100 of an object to be recognized and a gray image pattern 101 of a background. The object is the electronic component. According to the conventional threshold value calculating method, when an intensity histogram is formed by sampling the gray image pattern 102 and reading intensity data of the sampled gray image pattern 102, the intensity histogram formed by each sampling data has a pattern as shown in FIG. 26, wherein a peak at the bright intensity region of the object to be recognized is separated from a peak at the dark intensity region of the background.

Therefore, in FIG. 26, by obtaining a point at which a cumulative area of each of sampling data reaches a specified ratio (determined statistically to be, for example, 15%) relative to a total area of the intensity histogram from a brighter intensity side and predetermining the intensity at the point as a threshold value, a threshold value THL1 representing the border between the bright intensity region of the object to be recognized and the dark intensity region of the background can be easily obtained.

However, according to the aforementioned construction of the conventional art, the threshold value of intensity obtained from the gray image pattern becomes inappropriate. Therefore, when the threshold value is used, there is caused a disadvantage in that a positioning error, which means that a region of the object occupied in the image of the object and the background is recognized incorrectly, occurs in the image processing.

The reason of the above will be described with reference to FIG. 27. FIG. 27 shows a gray image pattern 112 comprised of a gray image pattern 110 of an object to be recognized and a gray image pattern 111 of the background. What is different from the aforementioned FIG. 25 is that a surface of the object to be recognized is dirty which allows a reduced reflection of light from the object to be recognized, and this results in a low intensity of the gray image pattern 110 of the object to be recognized. Thus, when an intensity histogram is formed by sampling the gray image pattern 112 including the gray image pattern 110 of the object to be recognized having dark intensity and reading the intensity data of the sampled gray image pattern 112, the intensity histogram is as shown in FIG. 28. When obtaining a point at which a cumulative area of each of sampling data reaches a specified ratio (15% for example) relative to a total area of the intensity histogram from a brighter intensity side and assuming that an intensity data at the point is a threshold value THL2, the intensity data at the threshold value THL2 is out of a range of intensity of the object to be recognized and enters a range of intensity of the background. Consequently, the obtained threshold value THL2 is 5.0, which is lower by 2.5 than the threshold value THL1=7.5 in the case of FIG. 26. In this manner, when the threshold value is too low, the background around the object is erroneously detected as a part of the object to be recognized, and as shown in FIG. 29, the object to be recognized that is indicated by the dashed line 110 is practically recognized in a slightly displaced position 110a indicated by the solid line.

SUMMARY OF THE INVENTION

An object of the present invention is to provide a component detecting method and apparatus capable of detecting an image of a component from a background with an appropriate threshold value even when reflected light from an object to be recognized is reduced by a stain of the object, or the intensity of the background changes more or less depending on illuminating conditions while achieving high-speed processing and high recognition accuracy.

In accomplishing the object, according to a first aspect of the present invention, there is provided a component detecting method for detecting an image of a component from a background with a threshold value, the method comprising:

an image digitizing process for digitizing an image signal of a component to be recognized and storing a digitized image signal as two-dimensional image data comprised of an intensity signal into an image data storing part;

an intensity data sampling process for sampling intensity data in an intensity data sampling area for sampling the intensity data in the two-dimensional image data and storing sampled data into an intensity data storing part;

an intensity profile forming process for forming an intensity profile obtained by rearranging the intensity data stored in the intensity data storing part in order of increasing values of the intensity data;

an intensity profile quadratic differential process for forming an intensity data quadratic differential table by quadratically differentiating the intensity data (IP(n)) in the intensity profile with respect to a data number n corresponding to the intensity data;

a zero-crossing point detecting process for detecting, from the intensity data quadratic differential table, a data number corresponding to a zero-crossing point at which adjacent quadratic differential data obtained by quadratically differentiating the intensity data (IP(n)) are changed between positive and negative through zero; and a threshold value calculating process for determining a threshold value according to an intensity data of the data number corresponding to the zero-crossing point, so as to detect the image of the component from a background with the calculated threshold value.

According to a second aspect of the present invention, there is provided a component detecting method for detecting an image of a component from a background with a threshold value as defined in the first aspect of the present invention, further comprising: an intensity data table compressing process provided between the intensity data sampling process and the intensity profile forming process, wherein in the intensity data table compressing process, when a total number of the intensity data stored in the intensity data storing part is not smaller than a predetermined specific value, every two adjacent intensity data of the intensity data are sequentially compared with each other and a compressed intensity data obtained by abandoning a smaller one of the compared intensity data and taking a greater one of the compared intensity data is stored into the intensity data storing part, and then compressed intensity data are used in the processes subsequent processes.

According to a third aspect of the present invention, there is provided a component detecting method for detecting an image of a component from a background with a threshold value as defined in the first aspect of the present invention, wherein in place of the intensity data sampling process and the intensity profile forming process, an intensity histogram forming process for forming an intensity histogram by sampling intensity data in an intensity data sampling area set on the two-dimensional image data;

a data compression ratio calculating process for calculating a data compression ratio R in compressing the intensity histogram into a compressed intensity histogram having a number $N_{LIM}$ of data in maximum according to an equation (1):

$$R=[N/N_{LIM}]+1 \qquad (1)$$

where N is a number of the intensity data, and $[N/N_{LIM}]$ is a maximum integer of a calculated result in this division; and a compressed intensity profile forming process for forming a compressed intensity profile by successively reading a frequency H(i) of i-th in the intensity histogram from an initial value of i (where i is a number of the intensity data), successively calculating a cumulative value S(i+1) of the frequency H(i) according to an equation (2):

$$S(i+1)=S(i)+H(i) \text{ (where } S(0)=0) \qquad (2),$$

determining whether or not the S(i+1) is less than R in every calculation of the equation (2), and repeating, if the S(i+1) is not less than R, calculation of an equation (3) until the S(i+1) is less than R:

$$\begin{aligned} S(i+1) &\leftarrow S(i+1) - R \\ IP(n) &= i \\ n &\leftarrow n+1; \end{aligned} \qquad (3)$$

are provided, and the compressed intensity profile is used in the subsequent processes.

According to a fourth aspect of the present invention, there is provided a component detecting method for detecting an image of a component from a background with a threshold value as defined in the first to the third aspects of the present invention, wherein the threshold value is calculated according to the intensity data of the data number corresponding to a negative quadratic differential data which is smaller than a preset reference value.

According to a fifth aspect of the present invention, there is provided a component detecting apparatus for detecting an image of a component from a background with a threshold value, the apparatus comprising:

an image data storing part for storing a digitized image signal of the component to be recognized as two-dimensional image data comprised of an intensity signal;

an intensity data storing part for storing intensity data in an intensity data sampling area for sampling the intensity data in the two-dimensional image data;

an intensity profile forming part for forming an intensity profile obtained by rearranging the intensity data stored in the intensity data storing part in order of increasing values of the intensity data;

an intensity profile quadratic differential part for forming an intensity data quadratic differential table by quadratically differentiating the intensity data (IP(n)) in the intensity profile with respect to a data number n corresponding to the intensity data;

a zero-crossing point detecting part for detecting, from the intensity data quadratic differential table, a data number at a zero-crossing point at which adjacent quadratic differential data obtained by quadratically differentiating the intensity data (IP(n)) are changed between positive and negative through zero; and a threshold value calculating part for determining a threshold value according to an intensity data of the data number corresponding to the zero-crossing point, so as to detect the image of the component from a background with the calculated threshold value.

According to a sixth aspect of the present invention, there is provided a component detecting apparatus for detecting an image of a component from a background with a threshold value as defined in the fifth aspect of the present invention, further comprising: an intensity data table compressing part, wherein in the intensity data table compressing part, when a total number of the intensity data stored in the intensity data storing part is not smaller than a predetermined specific value, every two adjacent intensity data of the intensity data are sequentially compared with each other and a compressed intensity data obtained by abandoning a smaller one of the compared intensity data and taking a greater one of the compared intensity data is stored into the intensity data storing part, and then compressed intensity data are used in the intensity profile forming part.

According to a seventh aspect of the present invention, there is provided a component detecting apparatus for detecting an image of a component from a background with a threshold value as defined in the fifth aspect of the present invention, wherein an intensity histogram forming part for forming an intensity histogram by sampling an intensity data in an intensity data sampling area set on the two-dimensional image data;

a data compression ratio calculating part for calculating a data compression ratio R in compressing the intensity histogram into a compressed intensity histogram having a number $N_{LIM}$ of data in maximum according to an equation (1):

$$R=[N/N_{LIM}]+1 \quad (1)$$

where N is the number of the intensity data, and $[N/N_{LIN}]$ is a maximum integer of a calculated result in this division; and a compressed intensity profile forming part for forming a compressed intensity profile by successively reading a frequency H(i) of i-th in the intensity histogram from an initial value of i (where i is a number of the intensity data), successively calculating a cumulative value S(i+1) of the frequency H(i) according to an equation (2):

$$S(i+1)=S(i)+H(i) \text{ (where } S(0)=0) \quad (2),$$

determining whether or not the S(i+1) is less than R in every calculation of the equation (2), and repeating, if the S(i+1) is not less than R, calculation of an equation (3) until the S(i+1) is less than R:

$$S(i+1) \leftarrow S(i+1) - R \quad (3)$$
$$IP(n) = i$$
$$n \leftarrow n + 1;$$

are provided, and the compressed intensity profile is used in the intensity profile quadratic differential part.

According to a eighth aspect of the present invention, there is provided a component detecting apparatus for detecting an image of a component from a background with a threshold value as defined in the fifth to the seventh aspects of the present invention, wherein the threshold value is calculated according to the intensity data of the data number corresponding to a negative quadratic differential data which is smaller than a preset reference value.

According to the first and fifth aspects of the present invention, in order not exert a bad influence on a result of position detection of the component to be recognized even when reflected light from the component to be recognized is reduced by a stain of the component, or the intensity of the background changes more or less depending on illuminating conditions, the following operations are executed. In the intensity profile forming process and part after the image digitizing operation and the intensity data sampling operation, the intensity profile is formed by rearranging the intensity data stored in the intensity data storing part in order of increasing a value of the intensity value. In the intensity profile quadratic differential process and part, the intensity data quadratic differential table is formed by quadratically differentiating the intensity data of the intensity profile with respect to the data number of the intensity data in the intensity profile. In the zero-crossing point detecting process and part, the data number corresponding to the zero-crossing point is detected. The zero-crossing point is a point at which the adjacent quadratic differential data change from the positive value to the negative value in the intensity data quadratic differential table. Finally, in the threshold value calculating process and part, according to the intensity data of the intensity profile of the data number corresponding to the zero-crossing point, the threshold value is determined. Then, the image of the component can be detected with the determined threshold value while distinguished from the background. Regarding this construction, the reason why the aforementioned object is achieved is as follows.

That is, when reflected light from the component to be recognized is reduced by a stain of the component, or the intensity of the background changes more or less depending on illuminating conditions, an absolute value of the intensity changes. Therefore, the threshold value is determined by the absolute value of the intensity as in the conventional art, it is impossible to avoid an error in the obtained threshold value. However, even when reflected light from the component is reduced by the stain of the component, or the intensity of the background changes more or less depending on illuminating conditions, the original pattern of intensity with respect to the component does not change. Therefore, such as the first and fifth aspects of the present invention, when forming the intensity data quadratic differential table having data on which the change of intensity in the original pattern of intensity directly reflects, detecting the data number corresponding to the zero-crossing point and obtaining a threshold value from the intensity data of the data number corresponding to the zero-crossing point, this threshold value is based on the original pattern of intensity that does not change. Therefore, the threshold value receives no bad influence of the stain and illumination.

According to the second and sixth aspects of the present invention, in order to increase the processing speed, the intensity data table compressing process and part are provided. When the total number of intensity data at the N points stored in the intensity data storing part is not smaller in number than the predetermined specific value $N_{MAX}$, the compressing operation executes to compare the two adjacent intensity data of the intensity data at the N points with each other and store the compressed intensity data obtained by abandoning a smaller one of the compared intensity data and taking a greater one of the compared intensity data into the intensity data storing part.

By the above data compression, the second and sixth aspects of the present invention allow the processing speed to be increased.

According to the third and seventh aspects of the present invention, in the data compression ratio calculating process and part, and the compressed intensity profile forming process and part, the data compression ratio R is calculated by using the number $N_{LIM}$ of data in maximum which can maintain the threshold value calculation accuracy at the required level. And then, by means of the data compression ratio R, the intensity histogram is compressed into the compressed intensity histogram. With this construction, the processing speed can be increased while maintaining the recognition accuracy.

Furthermore, according to the fourth and the eighth aspects of the present invention, the threshold value may be taken according to the zero-crossing point at which a negative quadratic differential data is smaller than the preset reference value. According to this construction, the generation of error caused by noise is avoided.

BRIEF DESCRIPTION OF THE DRAWINGS

These and other aspects and features of the present invention will become clear from the following description taken in conjunction with the preferred embodiments thereof with reference to the accompanying drawings, in which:

FIG. 5 is a diagram showing the intensity data at the sampling points in the embodiment of the present invention;

FIG. 7 is a diagram showing the intensity profile in the embodiment of the present invention;

FIG. 9 is a diagram of the intensity data quadratic differential table of the intensity profile in the embodiment of the present invention;

DETAILED DESCRIPTION OF THE PREFERRED EMBODIMENTS

Figure 1:
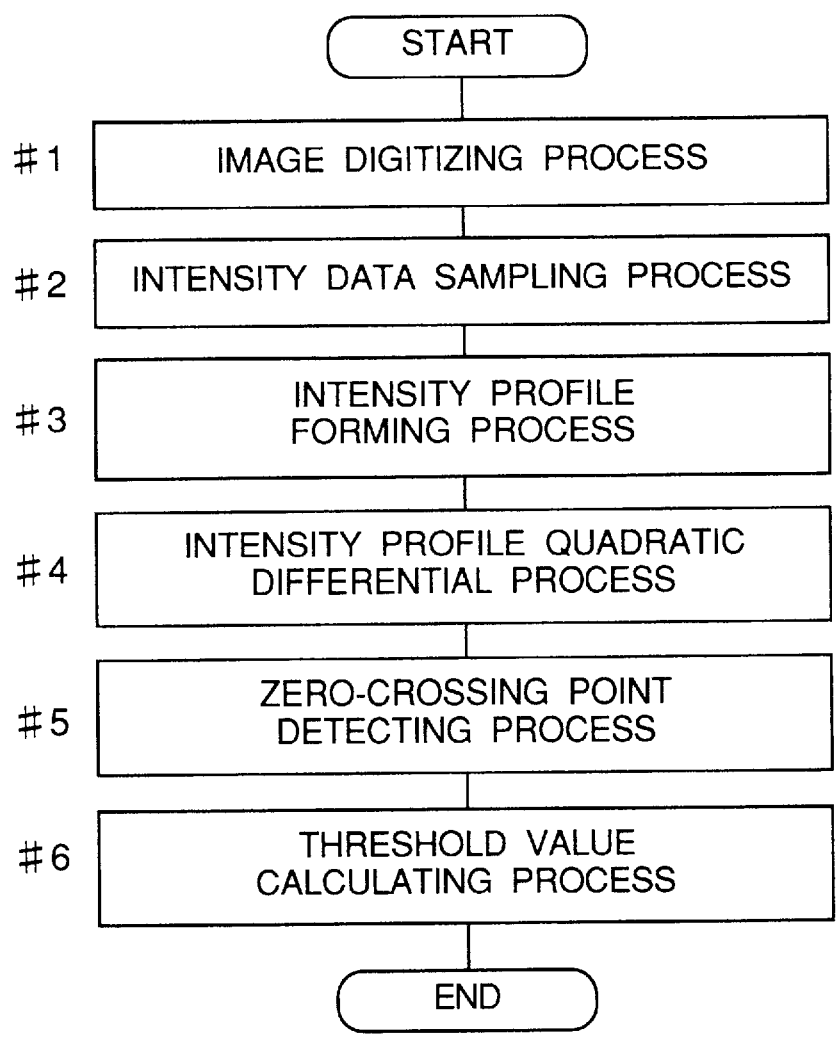
FIG. 1 is a flowchart showing the operation of a first embodiment of the present invention.

Before the description of the embodiment of the present invention proceeds, it is to be noted that like parts are designated by like reference numerals throughout the accompanying drawings.

A first embodiment of the present invention will be described with reference to FIGS. 1 through 10.

A component detecting method of the embodiment is executed by using a component detecting apparatus.

In an image digitizing process in step 1 of the flowchart in FIG. 1, the following operations are executed. Namely, prior to an image data processing, a main controller 29 stores therein information of component dimensions and the like of an electronic component 14, that is an object to be recognized, into an electronic component information storing part 30. Thereafter, an image of the electronic component 14 that is the object to be recognized and suctioned by a nozzle 13 of an X–Y robot 12 which can move the nozzle 13 toward the X and Y directions of the two-dimension, is taken by an image pickup part 16 such as a camera while illuminating the component by an illuminating part 15. An image signal outputted from the image pick up part 16 is digitized by a digitizing part 17 and then image data digitized by the digitizing part 17 are stored into an image data storing part 19 via an image data access part 18. The stored image data can be visually confirmed through a video monitor 20.

Figure 3:
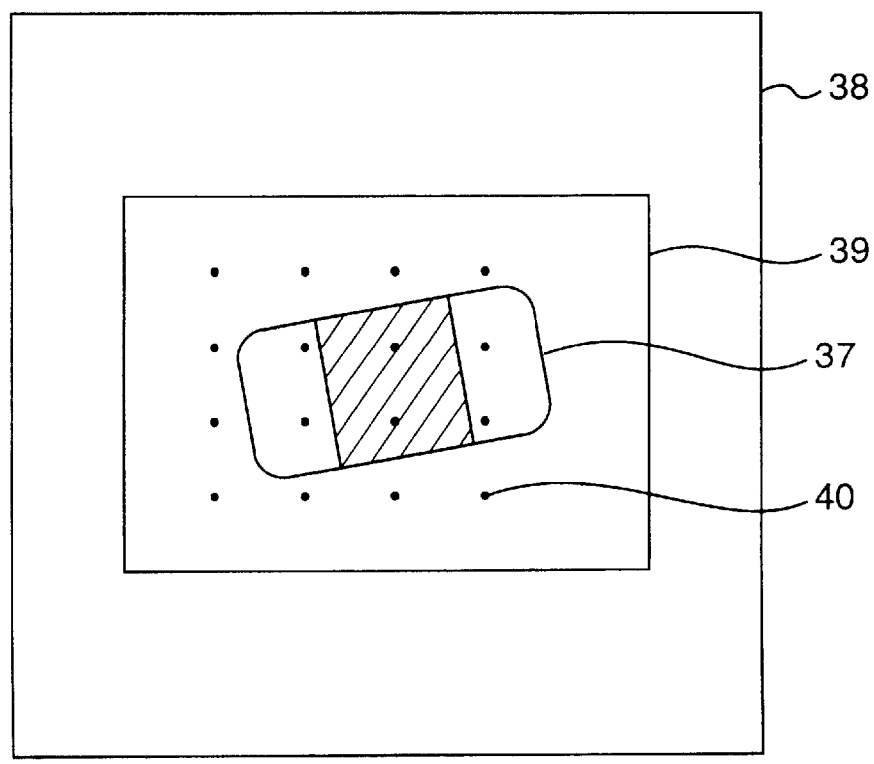
FIG. 3 is a diagram showing sampling points on two-dimensional image data in the embodiment of the present invention.

FIG. 3 shows a region of a two-dimensional image data 38 stored in the image data storing part 19 when the image digitizing process in step #1 is completed. In a center portion of the two-dimensional image data 38, a digital pattern 37 of the electronic component 14 which is the object to be recognized is stored.

In an intensity data sampling process in step #2, a central processing part 21 reads the information of the component dimension of the electronic component 14 from the storing part 30, which is preparatorily stored therein in a manner as described above. According to the component dimension, the central processing part 21 determines an intensity data sampling area 39 in the two-dimensional image data 38. Based on the dimension of the electronic component 14 and a suctioned portion of the component 14 suctioned by the nozzle 13, the central processing part 21 can change the region of the intensity data sampling area 39 according to dimensions of the nozzle 13 and the component. Then, sampling points 40 are set at regular intervals within the intensity data sampling area 39 by the central processing part 21. Based on the dimension of the electronic component 14 and the accuracy for recognizing the component 14 in the image taken by the image pickup part 16, the central processing part 21 can change the number of sampling points 40 which can be set beforehand therein. The central processing part 21 reads each of the image data corresponding to the sampling points 40 from the image data storing part 19 via the image data access part 18 and successively stores the image data as intensity data into an intensity data table storing part 23.

Figure 4:
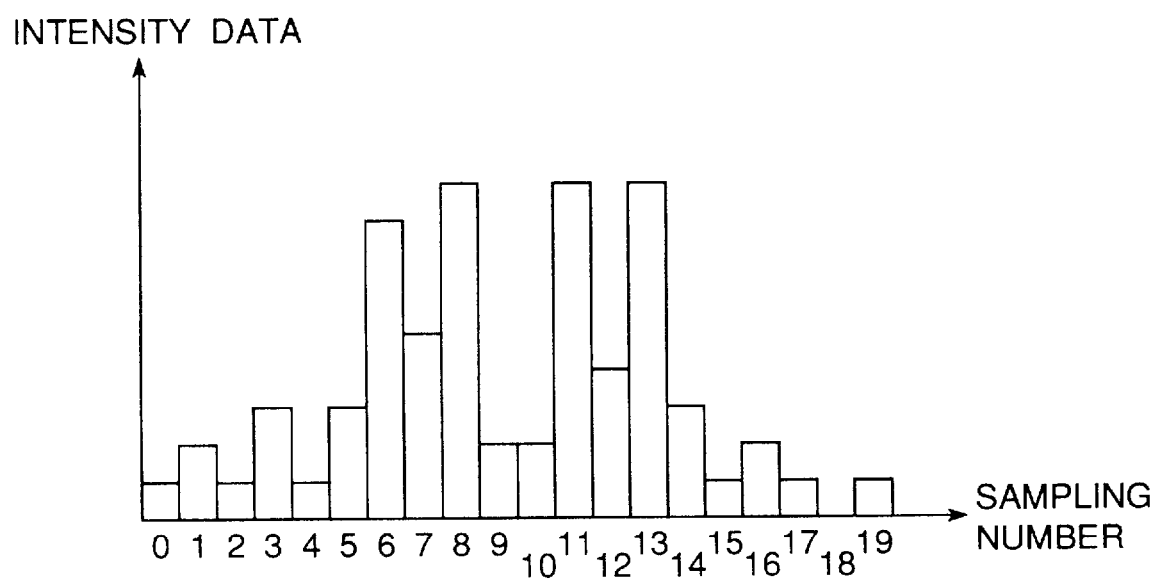
FIG. 4 is a graph showing intensity data at the sampling points in the embodiment of the present invention.

FIGS. 4 and 5 show the intensity data stored in the intensity data table storing part 23 when the intensity data sampling process in step #2 is completed. The axis of ordinate of FIG. 4 indicates a magnitude of the intensity data, and the further upward the axis extends, the greater the value of the intensity data becomes.

In an intensity profile forming process in step #3, an intensity profile forming part 22 rearranges the intensity data stored in the intensity data table storing part 23 in order of increasing values of the intensity data, i.e. in an ascending order that ranges from the lowest to highest in numeric value of the intensity data. The rearranged intensity data are stored as an intensity profile into the intensity data table storing part 23. In this embodiment, as described above, the intensity data are arranged from a smaller intensity data corresponding to a dark portion in an image obtained by the pickup part toward a greater intensity data corresponding to a light portion in the image. However, the arrangement of the intensity data is not limited in the aforementioned arrangement, the intensity data may arrange from the greater intensity data toward the smaller intensity data.

Figure 6:
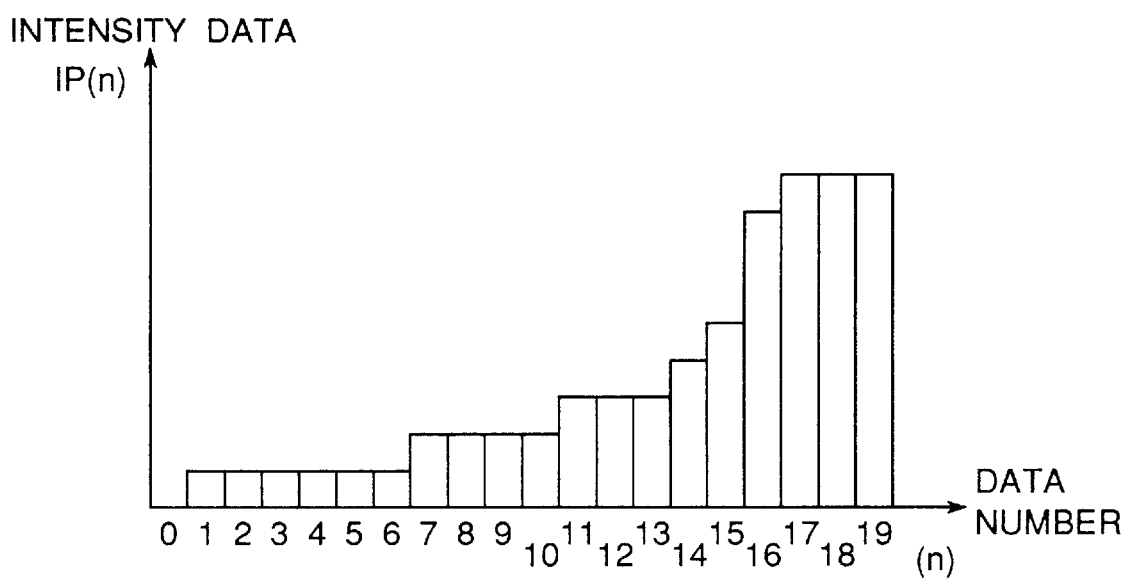
FIG. 6 is a graph showing an intensity profile in the embodiment of the present invention.

FIG. 6 shows a graph formed by the intensity profile stored in the intensity data table storing part 23 when the intensity profile forming process in step #3 is completed. In FIG. 6, the axis of ordinate thereof indicates a magnitude of the intensity data, and the further upward the axis extends, the greater the value of the intensity data becomes.

FIG. 7 shows individual intensity data that have been stored in the intensity data table storing part 23 and sorted therein when the intensity profile forming process in step #3 is completed.

In an intensity profile quadratic differential process in step #4, an intensity profile quadratic differential part 24 quadratically differentiates the intensity data of the intensity profile stored in the intensity data table storing part 23 with respect to the data number shown in FIG. 7 of the intensity data and then stores the calculated quadratic differential data into an intensity data quadratic differential table storing part 25.

Namely, the quadratic differential data $I''_n$ of the intensity data $I_n$ can be obtained by the intensity profile quadratic differential part 24 that successively reads the intensity data stored in the intensity data table storing part 23 and executes calculation of the equation (4):

$$I''_n = I_{n+1} - 2 \times I_n + I_{n-1} \quad (4)$$

where $0 \leq n \leq N-1$, $I_{-1} = I_0$

Wherein, "n" represents the data number as shown in FIG. 7. Also, the intensity data "$I_n$" represents an intensity data corresponding to the data number n. For example, the intensity data $I_0$ is 0, and then $$\begin{aligned} I''_0 &= I_1 - 2 \times I_0 + I_{-1} \\ &= 1 - 2 \times 0 + 0 \\ &= 1 \end{aligned}$$

Figure 8:
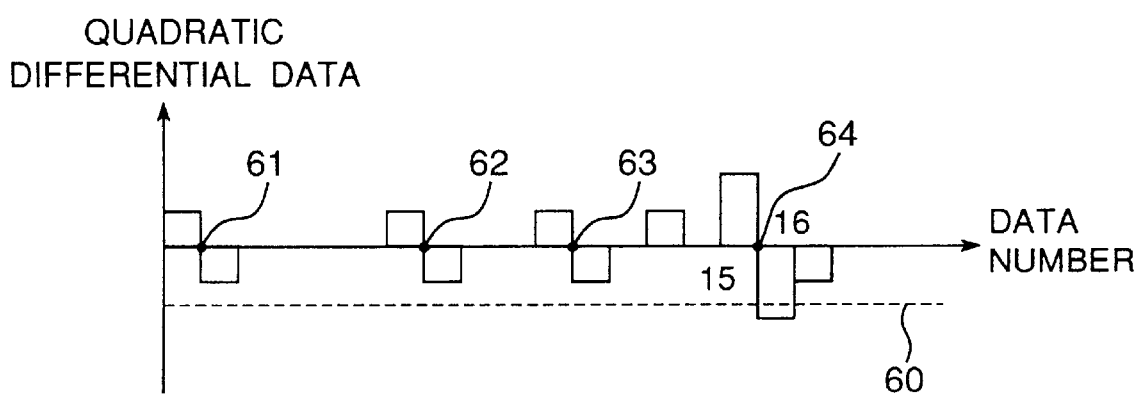
FIG. 8 is a graph of an intensity data quadratic differential table of the intensity profile in the embodiment of the present invention.

FIG. 8 shows a graph formed by data stored in the intensity data quadratic differential table storing part 25 obtained when the intensity profile quadratic differential process in step #4 is completed.

FIG. 9 shows individual quadratic differential data calculated by the equation (4) and stored in the intensity data quadratic differential table storing part 25 when the intensity profile quadratic differential process in step #4 is completed.

In a zero-crossing point detecting process in step #5, as described below in detail, a zero-crossing point detecting part 26 detects a data number corresponding to a zero-crossing point according to the quadratic differential data stored in the intensity data quadratic differential table storing part 25.

That is, based on the intensity data quadratic differential table stored in the intensity data quadratic differential table storing part 25 as shown in FIG. 9, a point at which the quadratic differential data changes from a positive value to a negative value is searched by the zero-crossing point detecting part 26 from the top of the table. And then, from searched points 61, 62, 63, and 64, a single zero-crossing point 64 is selected by searching a negative quadratic differential data which is smaller than a predetermined reference value shown by a reference numeral of 60 in FIG. 8. The predetermined reference value is decided experimentally to meet a requested accuracy. As is apparent from FIG. 8, if a point at which the quadratic differential data changes from the positive value to the negative value is merely detected, the detected points 61, 62 and 63 are considered as noise. Therefore, by providing the specified reference value 60, and one point 64 at which the negative quadratic differential data firstly becomes smaller than the reference value 60 is determined as the zero-crossing point. In FIG. 8, the data number is 16, in which the negative quadratic differential data firstly becomes smaller than the reference value 60 indicated by the dashed line. Therefore, the zero-crossing point is considered to be located between the data number of 15 and the data number of 16.

Figure 10:
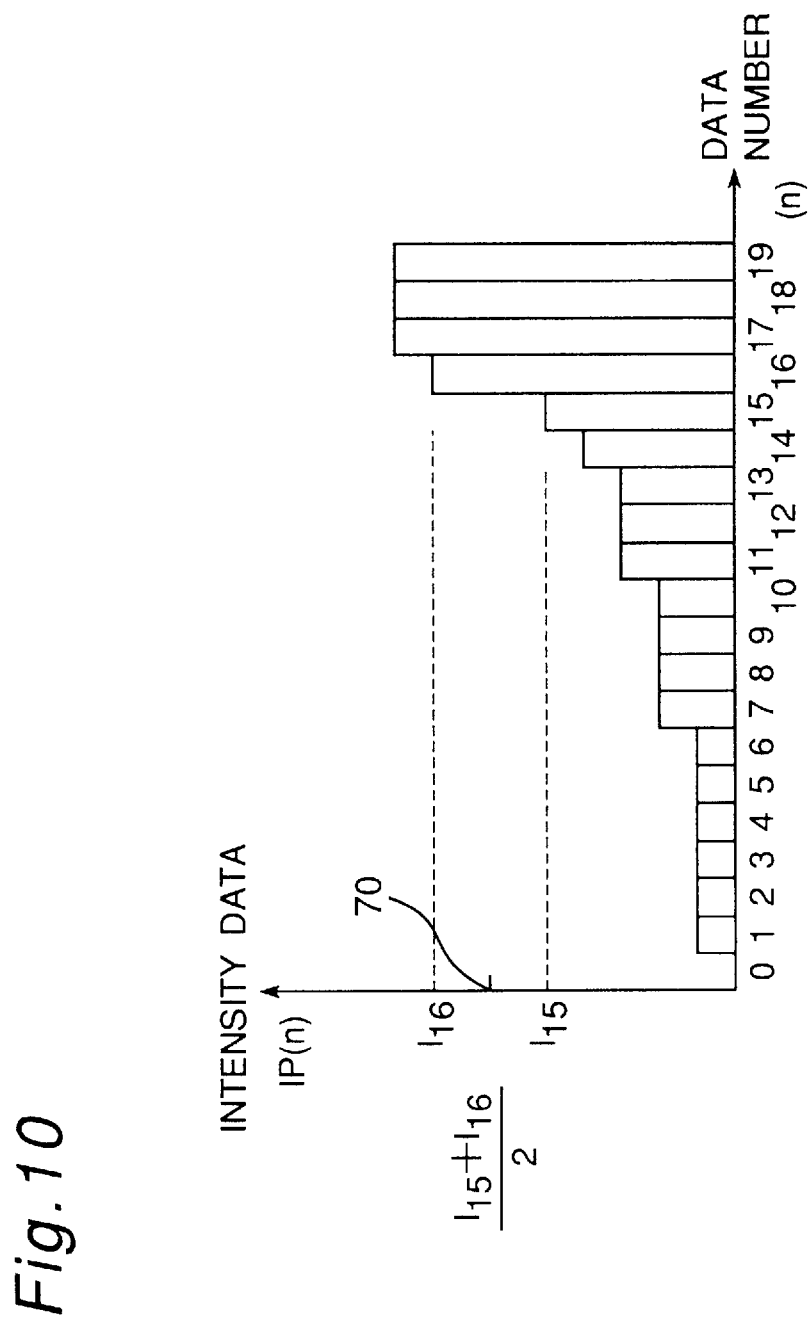
FIG. 10 is a graph showing a threshold value in the embodiment of the present invention.

In a threshold value calculating process in step #6, a threshold value calculating part 27 reads the intensity data, as a threshold value THL, corresponding to the data number at the zero-crossing point detected through the zero-crossing point detecting process in step #5 from the intensity profile stored in the intensity data table storing part 23 as shown in FIG. 10. In FIG. 8, the zero-crossing point is located between the data number of 15 and the data number of 16. Therefore, as shown in FIG. 10, an average value $(I_{15}+I_{16})/2$ calculated by averaging intensity data of $I_{15}$ and $I_{16}$ corresponding to the data numbers of 15 and 16 is obtained as the threshold value THL shown by a reference numeral of 70.

In this embodiment, the threshold value is calculated by using the intensity data of $I_{15}$ and $I_{16}$ corresponding to the data numbers of 15 and 16 which are adjoined at the zero-cross point. However, the threshold value may be determined by an intensity data of one data number corresponding to the zero-crossing point. For example, in this embodiment, the threshold value may be determined by the intensity data of $I_{15}$ corresponding to the data number of 15 or the intensity data of $I_{16}$ corresponding to the data number of 16.

The calculated threshold value is used for calculating a center position and an inclination of the electronic component 14 that is the object to be recognized by a center and inclination detecting part 28. In this case, as described above, prior to the input of the image data to the image data storing part 19, the information of the component dimensions and the like of the electronic component 14 that is the object to be recognized has been transmitted from the main controller 29 and is stored in the electronic component information storing part 30. Therefore, the center position and inclination are calculated by means of the information.

The center position and inclination of the electronic component 14 are calculated by means of the aforementioned threshold value THL by setting a rough search area surrounding the electronic component by means of the component dimensions of the electronic component 14 and setting a plurality of points arranged in a lattice form for every desired pixel inside the rough search area. And then the center position and inclination are calculated according to the expressions (5):

Center position: (Sx/N, Sy/N)

Inclination: $(1/2)\tan^{-1}(S1/S2)$ where $S1 = 2(N \times Sxy - Sx \times Sy)$ $S2 = (N \times Sxx - Sx \times Sy) - (N \times Syy - Sx \times Sy)$ and $$N = \sum^x \sum^y \rho(x,y)$$

$$Sx = \sum^x \sum^y \rho(x,y)x$$

$$Sy = \sum^x \sum^y \rho(x,y)y$$

$$Sxx = \sum^x \sum^y \rho(x,y)x^2$$

$$Syy = \sum^x \sum^y \rho(x,y)y^2$$

$$Sxy = \sum^x \sum^y \rho(x,y)xy$$

$\rho(x, y) = \max[\text{intensity data}(x, y) - \text{THL}, 0]$ where $\rho(x, y)$ represents a position in the X–Y coordinate.

The calculated center position and inclination of the electronic component 14 are once stored in an electronic component position storing part 31 and then transmitted to the main controller 29. The main controller 29 operates the X–Y robot 12 by using the center position and inclination information of the electronic component 14 to allow the electronic component 14 to be mounted in the correct position on a printed circuit board.

A second embodiment of the present invention will be described next with reference to FIGS. 11 through 15.

Figure 11:
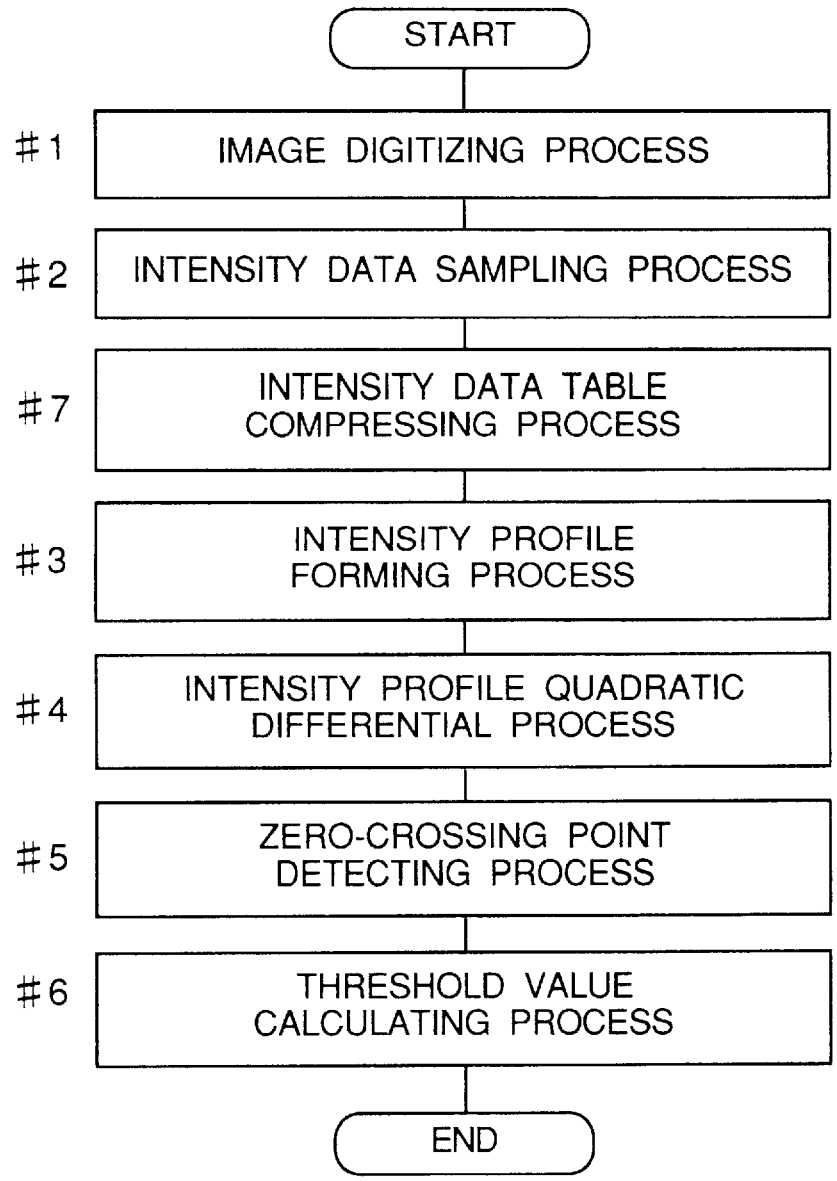
FIG. 11 is a flowchart showing the operation of a second embodiment of the present invention.

A flowchart of the second embodiment shown in FIG. 11 differs from the flowchart of the first embodiment shown in FIG. 1 in that a step #7 is inserted between the step #2 and the step #3 of FIG. 1.

Figure 2:
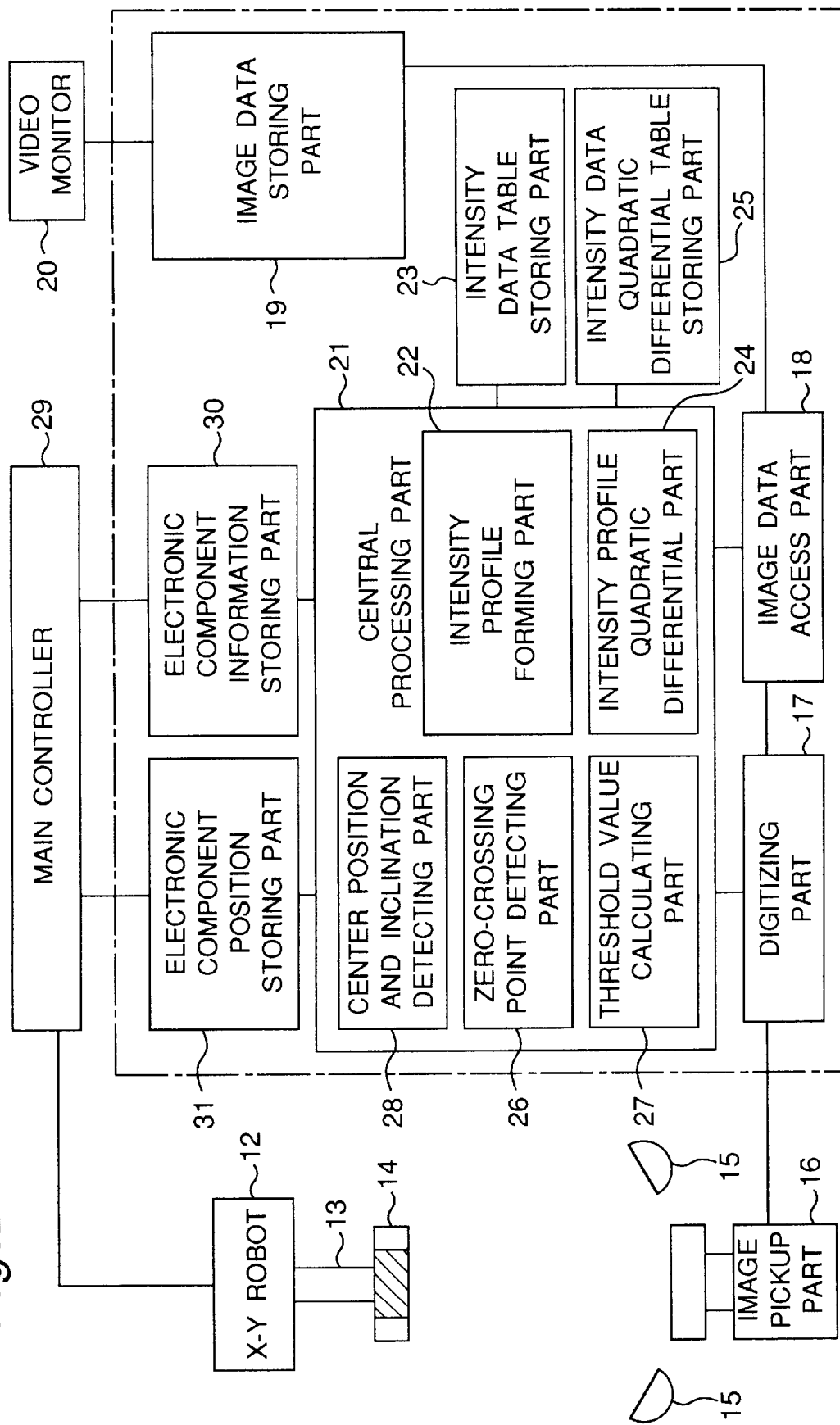
FIG. 2 is a block diagram of an apparatus employing the first embodiment of the present invention.
Figure 12:
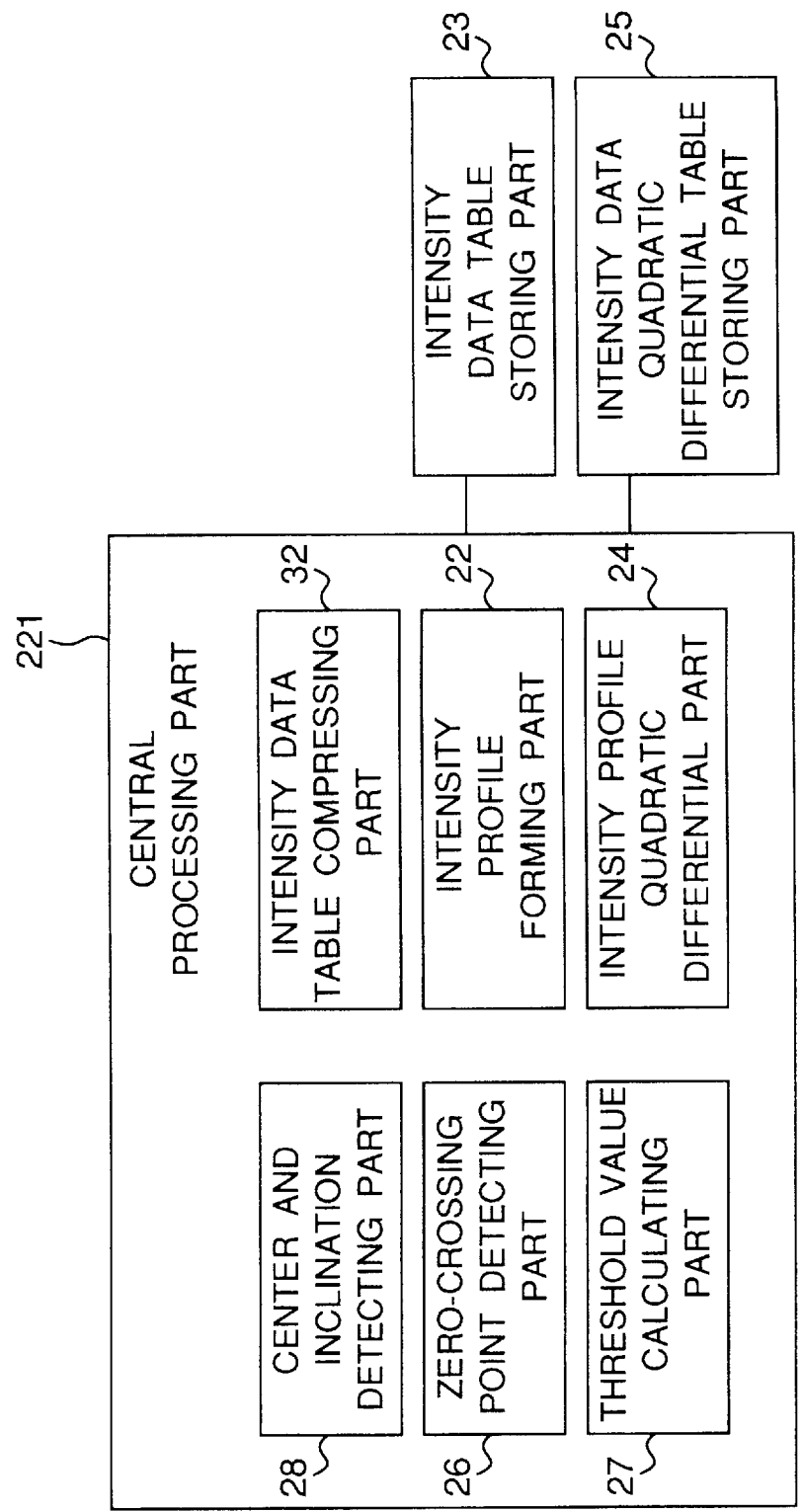
FIG. 12 is a block diagram of a part of an apparatus employing the second embodiment of the present invention.

In a block diagram of the second embodiment shown in FIG. 12, the point that the second embodiment differs from the block diagram of the first embodiment shown in FIG. 2 is included.

The present embodiment will be described below, in which no description is provided for the same parts as that of the first embodiment, and thus an intensity data table compressing process in step #7 of FIG. 11 will be mainly described.

In the intensity data table compressing process in step #7 shown in FIG. 11, when a total number N of the intensity data obtained through the intensity data sampling process in step #2 is not smaller than a predetermined specific number $N_{MAX}$, the intensity data stored in the intensity data table storing part 23 are compressed until the number N of the intensity data becomes smaller than the specific number $N_{MAX}$ so as to reduce the size of the intensity data table, thereby increasing the processing speed in the processes subsequent to step #7. The specific number $N_{MAX}$ may be determined in accordance with a required size of the intensity data.

Figure 13:
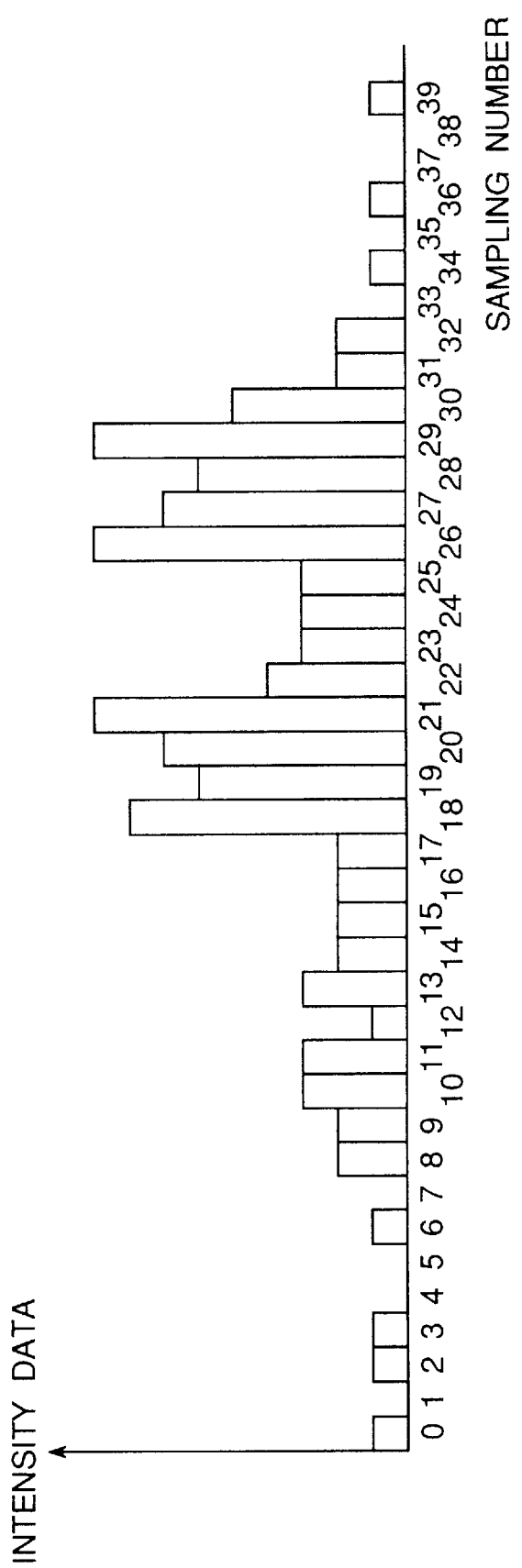
FIG. 13 is a graph showing intensity data at sampling points in the embodiment of the present invention.
Figure 14:
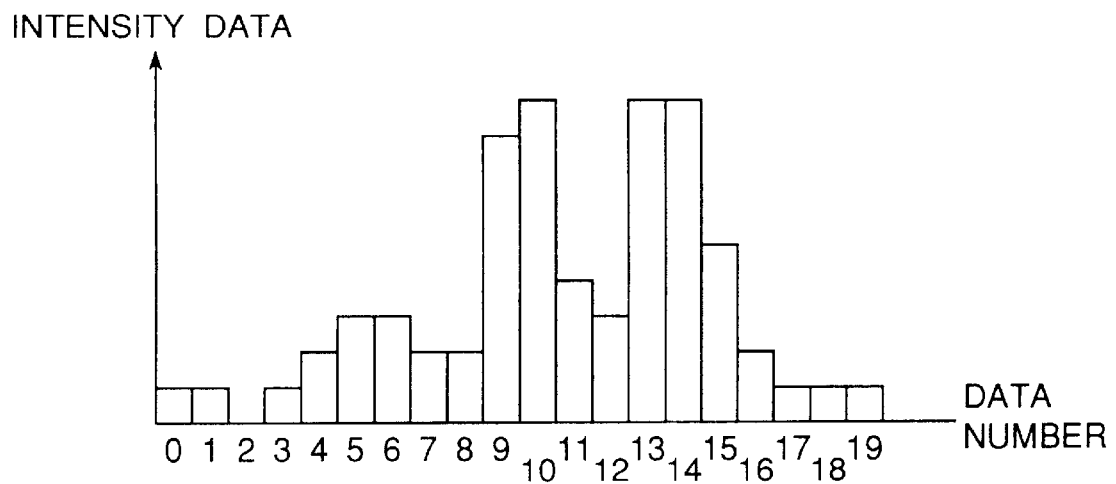
FIG. 14 is a graph showing intensity data at sampling points in the embodiment of the present invention.
Figure 15:
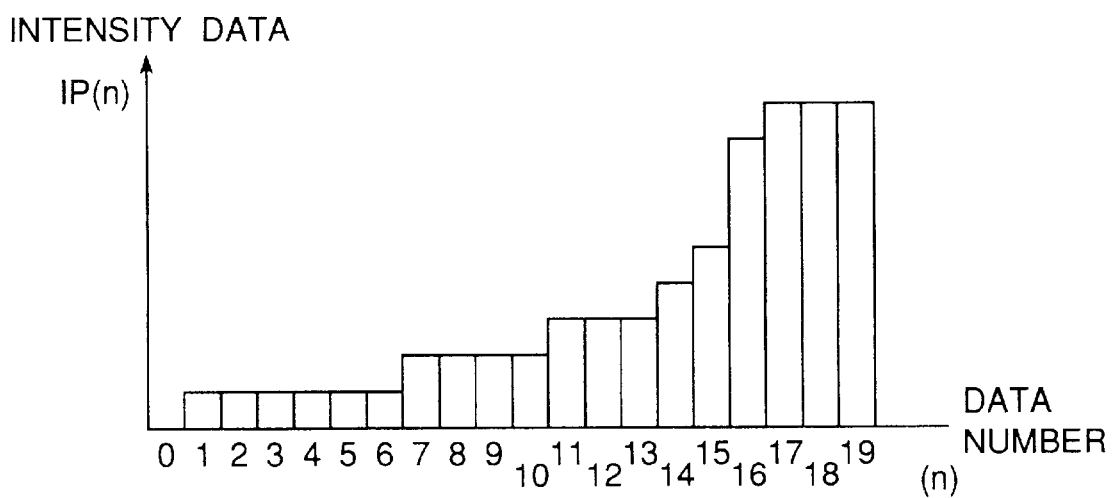
FIG. 15 is a graph showing a compressed intensity profile in the embodiment of the present invention.

Specifically, an intensity data table compressing part 32 reads an intensity data sequentially from the initial data number, i.e. the data number of 0 shown in an intensity data table as shown in FIG. 13. And the compressing part 32 forms a data pair consisting of a combination of two data adjoining to each other. And then the compressing part 32 compares with the two intensity data in each data pair. Then the intensity data having a smaller value is abandoned, and only the intensity data having a greater value is stored again into the intensity data table storing part 23 by the compressing part 32. Then a compressed intensity data table as shown in FIG. 14 is obtained. If the two intensity data to be compared are equal to each other, either of the two is stored into the table storing part 23. Next by executing an intensity profile forming process for rearranging the intensity data stored in the compressed intensity data table in the order of increasing values of the intensity data, an intensity profile as shown in FIG. 15 is obtained. Subsequently, the same processing as that of the first embodiment will be executed to calculate the threshold value.

A third embodiment of the present invention will be described next with reference to FIGS. 16 through 23.

Figure 16:
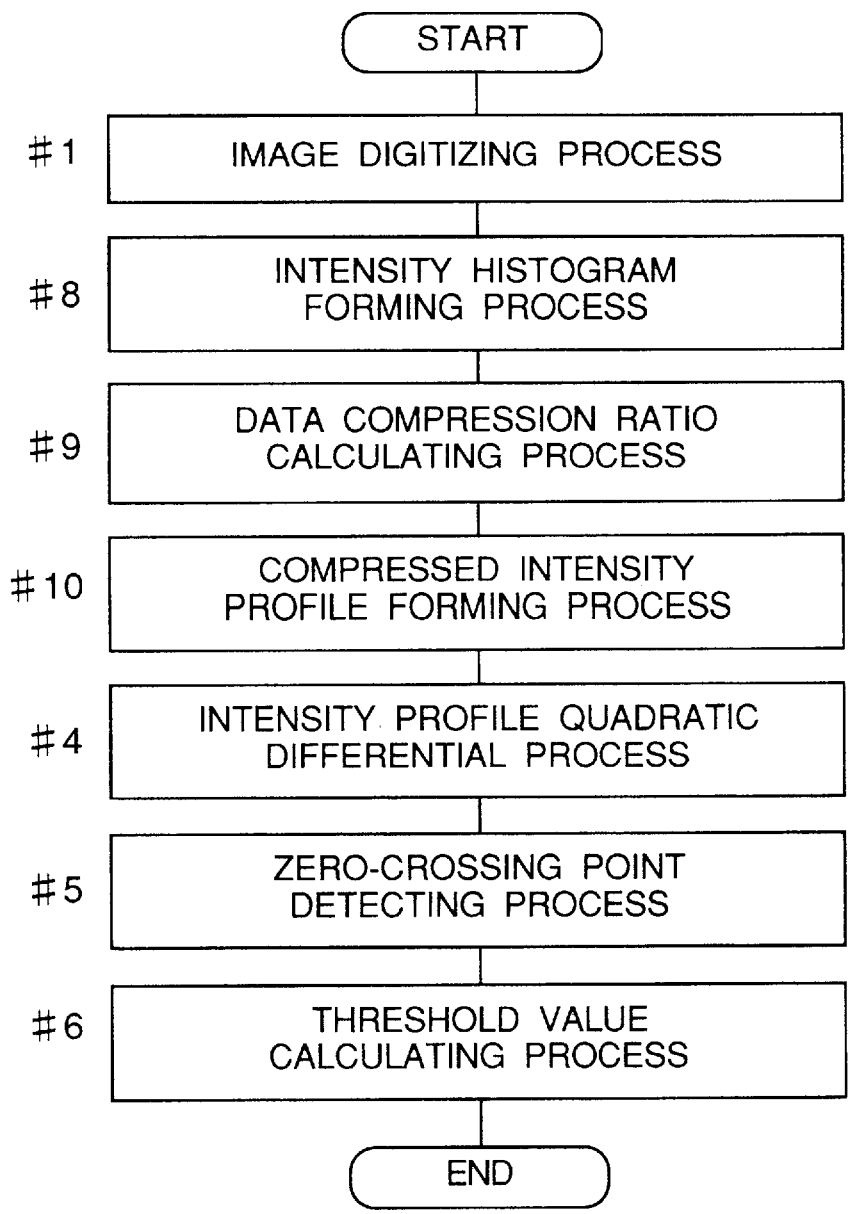
FIG. 16 is a flowchart showing the operation of a third embodiment of the present invention.

A flowchart of the third embodiment shown in FIG. 16 differs from the flowchart of the first embodiment shown in FIG. 1 in that steps #8 through #10 are inserted in place of the step #2 and the step #3 of FIG. 1.

Figure 17:
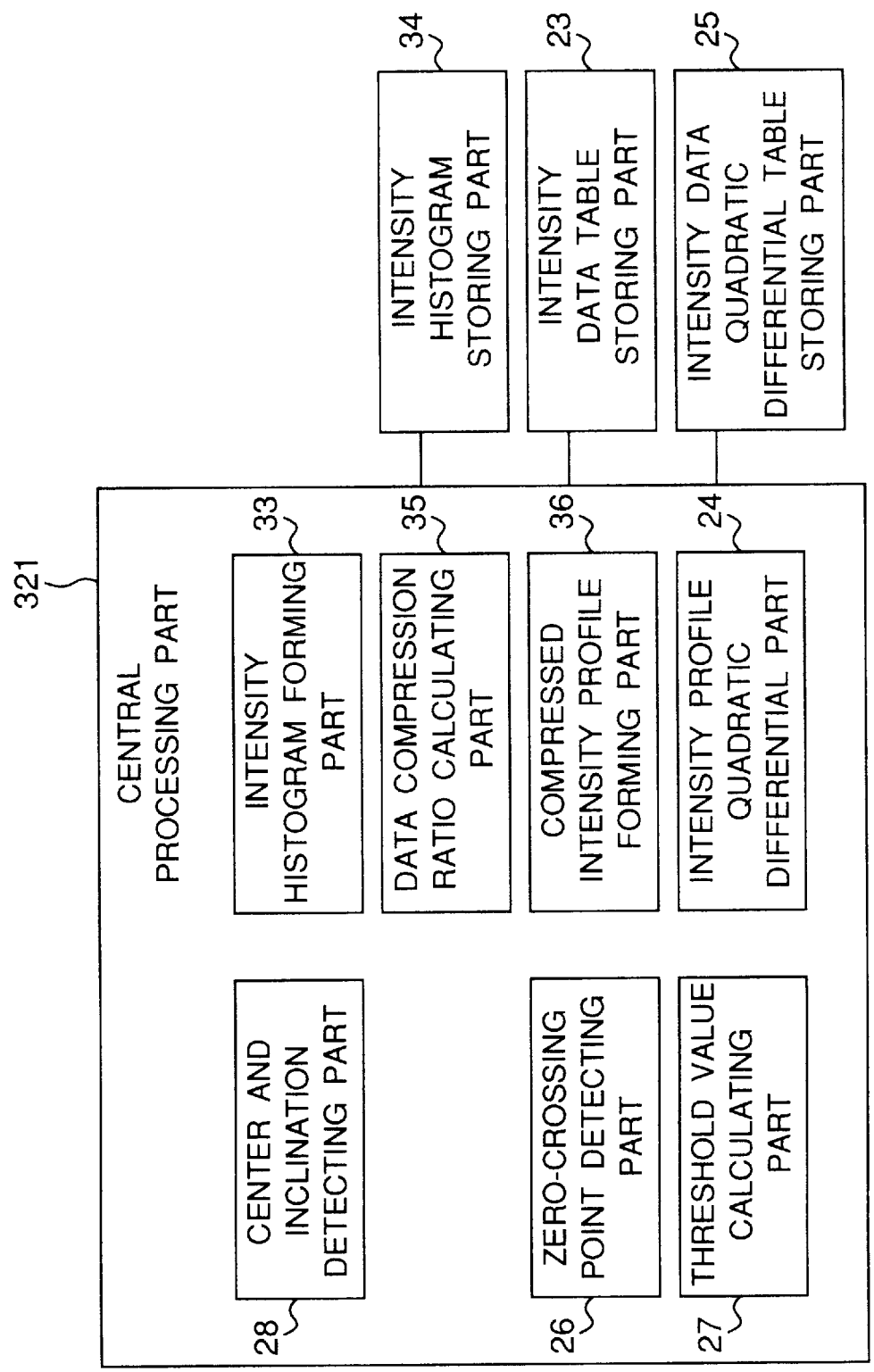
FIG. 17 is a block diagram of a part of an apparatus employing the third embodiment of the present invention.

In a block diagram of the third embodiment shown in FIG. 17, the point that the third embodiment differs from the block diagram of the first embodiment shown in FIG. 2 is included.

The third embodiment will be described below, in which no description will be provided for the same parts as that of the first embodiment, and thus step #8 through step #10 shown in FIG. 16 will be mainly described.

Figure 18:
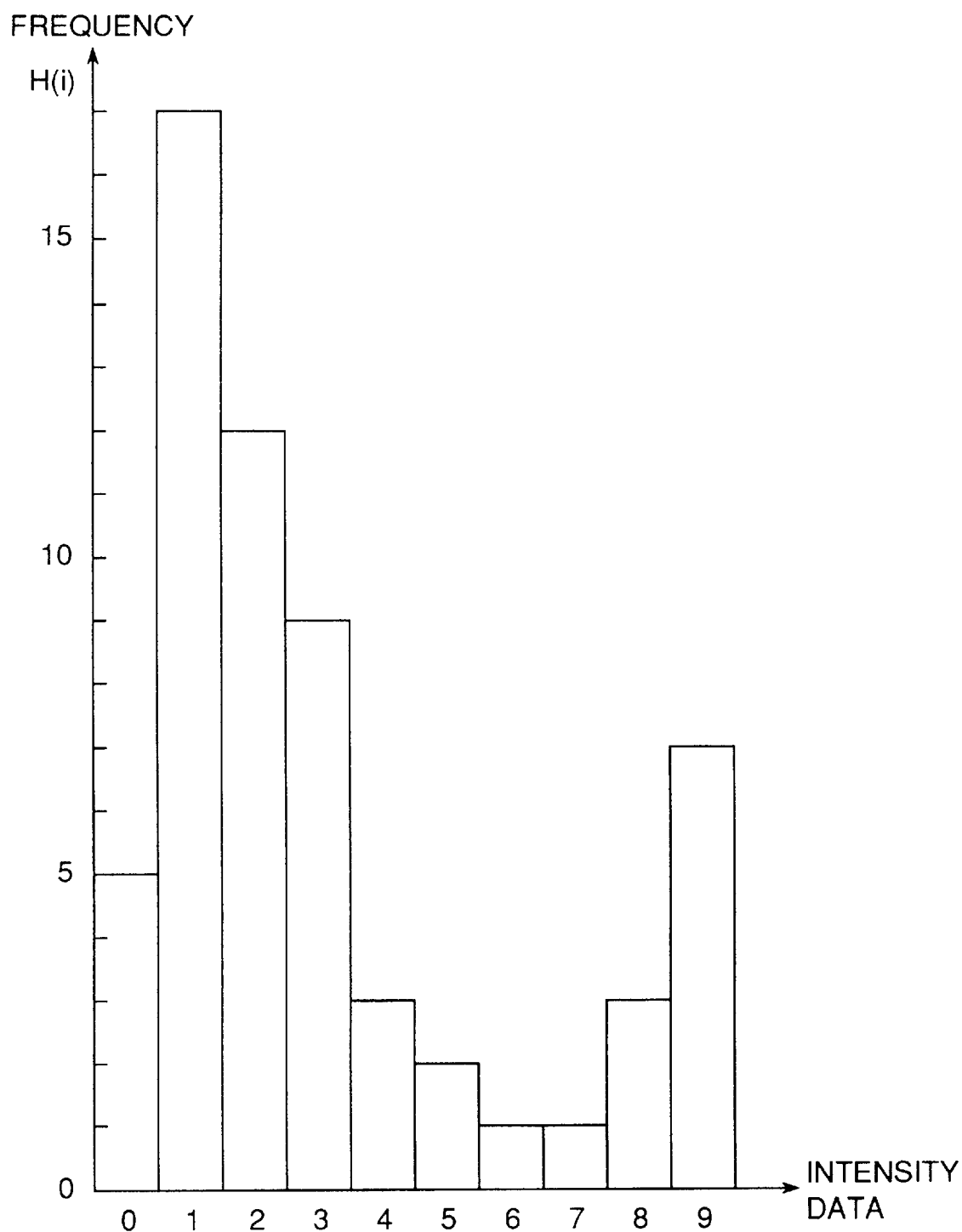
FIG. 18 is a graph showing intensity data at sampling points in the embodiment of the present invention.

In an intensity histogram forming process in step #8 shown in FIG. 16, similarly to the intensity data sampling process in step #2 shown in FIG. 1, an intensity data sampling area is set in the two-dimensional image data, and intensity data at N points are successively sampled by an intensity histogram forming part 33. Then according to the intensity data, the intensity histogram forming part 33 forms an intensity histogram as shown in FIG. 18 which is a frequency H(i) of i-th distribution table of intensity and stores it into an intensity histogram 34. In FIG. 18, the frequency H(i) represents the length of the column and the axis of abscissa represents the data number of the intensity data.

In a data compression ratio calculating process in step #9, a data compression ratio calculating part 35 calculates a data compression ratio R at which the intensity histogram is compressed into a compressed intensity histogram having the number $N_{LIM}$ of data in maximum according to the equation (1):

$$R = [N/N_{LIM}] + 1 \quad (1)$$

where N is the number of the intensity data, and $[N/N_{LIM}]$ is a maximum integer of the calculated result in this division.

Assuming that the number of the intensity data, i.e. N is 60 and the number of data in the maximum, i.e. $N_{LIM}$ is 25, the data compression ratio R is 3 from the equation (1). When the data compression ratio R=3, the frequency of 3 is compressed into a frequency of 1.

Figure 24:
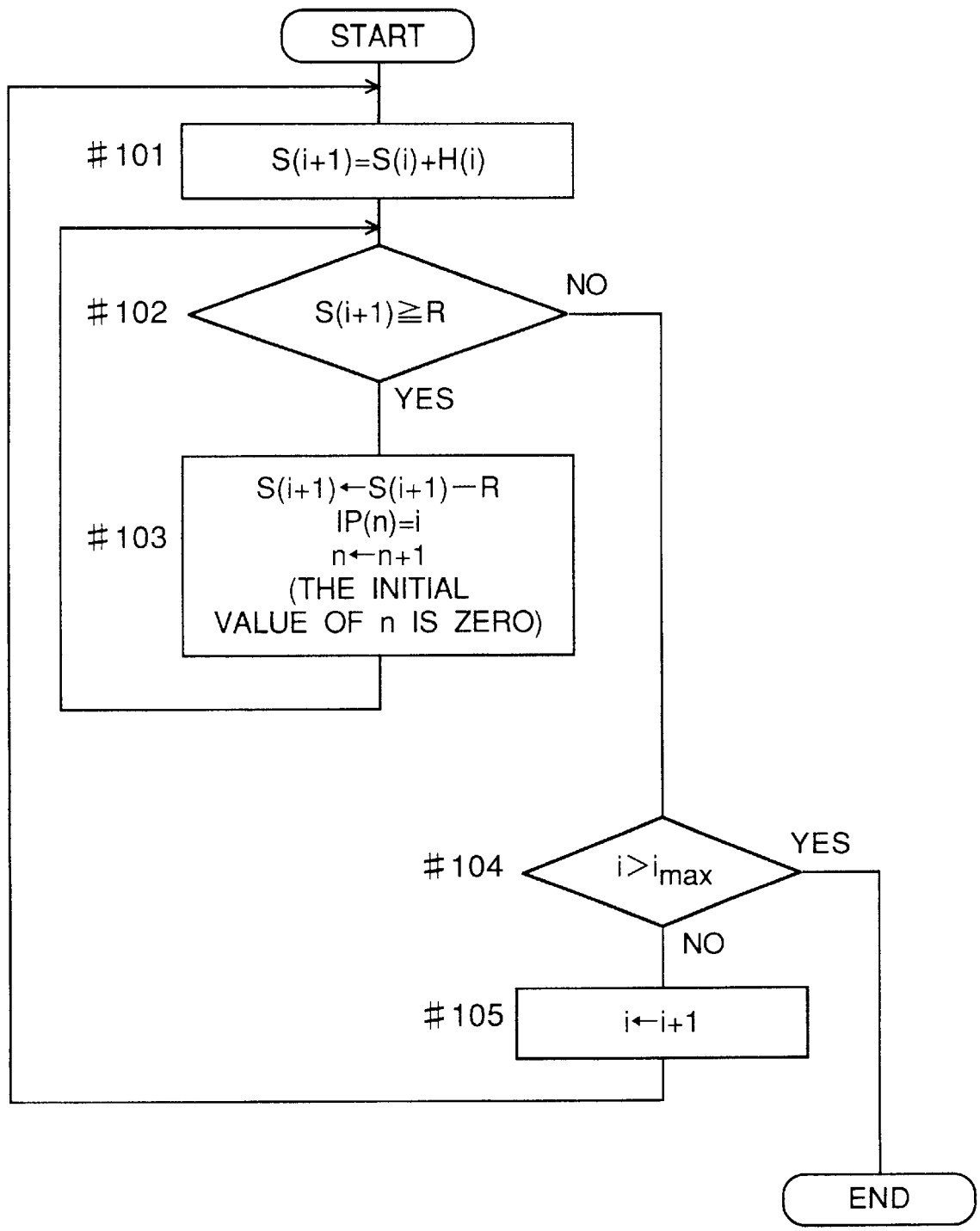
FIG. 24 is a flowchart showing the operation of a compressed intensity profile forming process in the third embodiment of the present invention.
Figure 25:
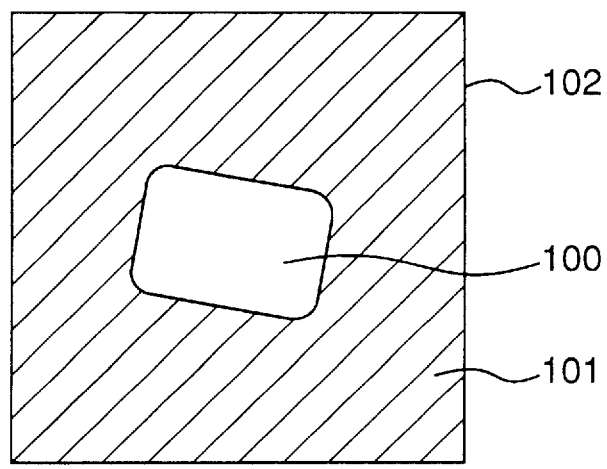
FIG. 25 is a diagram showing two-dimensional image data of a conventional art.
Figure 27:
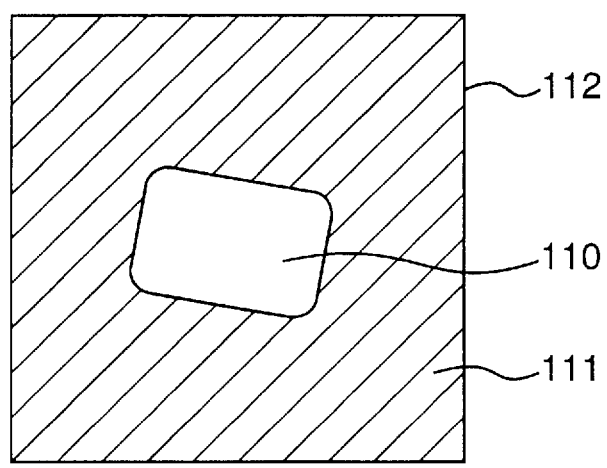
FIG. 27 is a diagram showing two-dimensional image data of the conventional art.

An operation of a compressed intensity profile forming process in step #10 is shown in detail in FIG. 24.

In the compressed intensity profile forming process, in step #101 of FIG. 24, a compressed intensity profile forming part 36 reads the frequency H(i) of the intensity histogram as shown in FIG. 18 sequentially from i=0, successively calculates a cumulative value S(i+1) of H(i) according to the equation (2).

$$S(i+1) = S(i) + H(i) \text{ provided that } S(0) = 0 \quad (2)$$

And then, in step #102 of FIG. 24, it is determined whether or not the calculated S(i+1) is less than the R in every calculation of the equation (2). If the S(i+1) is not less than the R, in step #103 of FIG. 24, a calculation of the equation (3) shown in below is repeated until the S(i+1) is less than the R.

$$\begin{aligned} S(i+1) &\leftarrow S(i+1) - R \\ IP(n) &= i \text{(where, an initial value of } n \text{ is zero.)} \\ n &\leftarrow n+1 \end{aligned} \quad (3)$$

Figure 19:
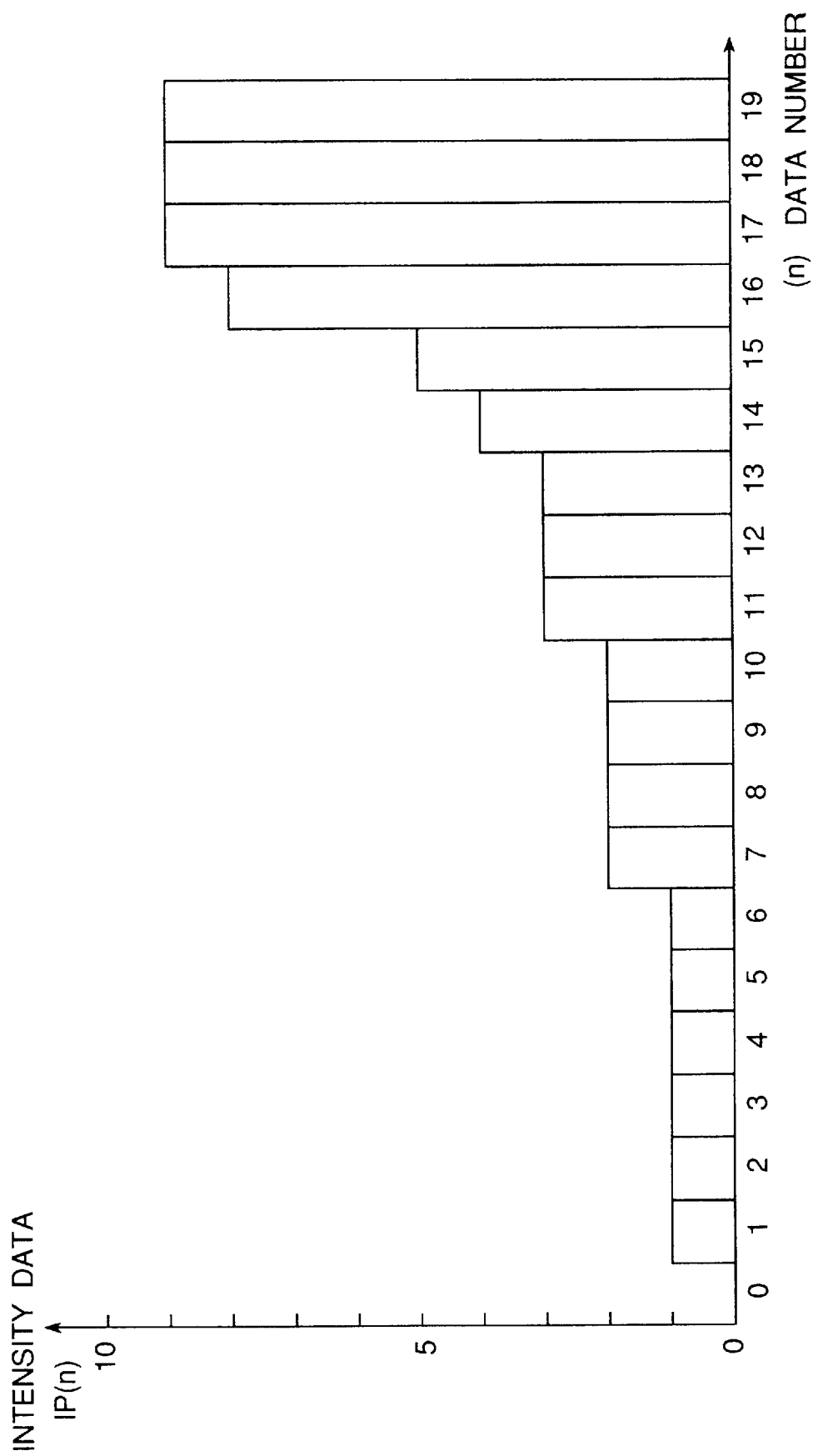
FIG. 19 is a graph showing a compressed intensity profile of the embodiment of the present invention.

Where, IP(n) is an intensity data in the compressed intensity profile as shown in FIG. 19, and n is a data number of the intensity data. An initial value of n is zero.

When the S(i+1) is less than the R, in step #104 of FIG. 24, it is determined whether or not i is more than $i_{max}$. Where, $i_{max}$ is 9 as shown in FIG. 18 in this third embodiment. If i is not more than $i_{max}$, in step #105 of FIG. 24, i is increased one by one to go to the step #101. When i is more than $i_{max}$, this compressed intensity profile forming process is over.

For example, according to the above, when an intensity histogram as shown in FIG. 18 is processed to form the compressed intensity profile, a compressed intensity profile as shown in FIG. 19 is obtained.

A specific operation of the compressed intensity profile forming process is described below with reference to FIGS. 18 and 19. Where, the value of the i ranges 0 to 9, so, the $i_{max}$ is 9 as shown in FIG. 18, and according to FIG. 18, H(0) is 5, H(1) is 17 . . . , and H(9) is 7. Also, the R is 3.

When i is 0,
in the step #101, according to the equation (2), S(1) is calculated. Namely, S(1)=S(0)+H(0)=0+5=5. According to the equation (3), first, in step #102, it is determined whether or not the calculated S(1) is less than the R. In this time, as S(1) is more than the R(=3), secondly, in step #103, the calculation of S(1)-R is executed. So, S(1) is 2. Also, according to the equation (3), as the initial value of n is zero, IP(0) is equal to 0, and then n is set to 1. Next, the steps #104 and #105 are executed.

Next, when i is 1,
in the step #101, according to the equation (2), S(1) is calculated. Namely, S(2)=S(1)+H(1)=2+17=19. According to the equation (3), in step #102, as S(2) is more than the R(=3). So, in step #103, the calculation of S(1) R is executed, S(2) is 16 (=19−3). Also, according to the equation (3), IP(1) is equal to 1 (=i), and then n is set to 2. However, as S(2) (=16) is still more than R, further, the calculation of S(2)−R is executed, S(2) is 13 (=16−3). Also, as n is set to 2, then IP(2) is equal to 1 (=i), and then n is set to 3. In the same way, this calculation is repeated until the S(2) is less than the R. Namely;

S(2)=13−3=10, IP(3)=1, n=4,
S(2)=10−3=7, IP(4)=1, n=5,
S(2)=7−3=4, IP(5)=1, n=6,
S(2)=4−3=1, IP(6)=1, n=7.

Next, when i is 2, similar to the above, the calculation of steps #101 to #103 are executed. Namely;

S(3)=S(2)+H(2)=1+12=13.
S(3)=13−3=10, IP(7)=2, n=8,
S(3)=10−3=7, IP(8)=2, n=9,
S(3)=7−3=4, IP(9)=2, n=10,
S(3)=4−3=1, IP(10)=2, n=11.

Next, when i is 3, similar to the above, the calculation of steps #101 to #103 are executed. Namely;

S(4)=S (3)+H(3)=1+9=10,
S(4)=10−3=7, IP(11)=3, n=12,
S(4)=7−3=4, IP(12)=3, n=13,
S(4)=4−3=1, IP(13)=3, n=14.

Similar to the above, the calculation of steps #101 to #103 are executed until i is 9, when i is 9, S(10) and IP are shown as follows. Namely;

S(10)=S(9)+H(9)=2+7=9,
S(10)=9−3=6, IP(17)=9, n=18,
S(10)=6−3=3, IP(18)=9, n=19,
S(10)=3−3=0, IP(19)=9, n=20.

In this manner, each of the values of IP(0) to IP(19) is calculated, and thus the compressed intensity profile as shown in FIG. 19 is obtained.

Figure 20:
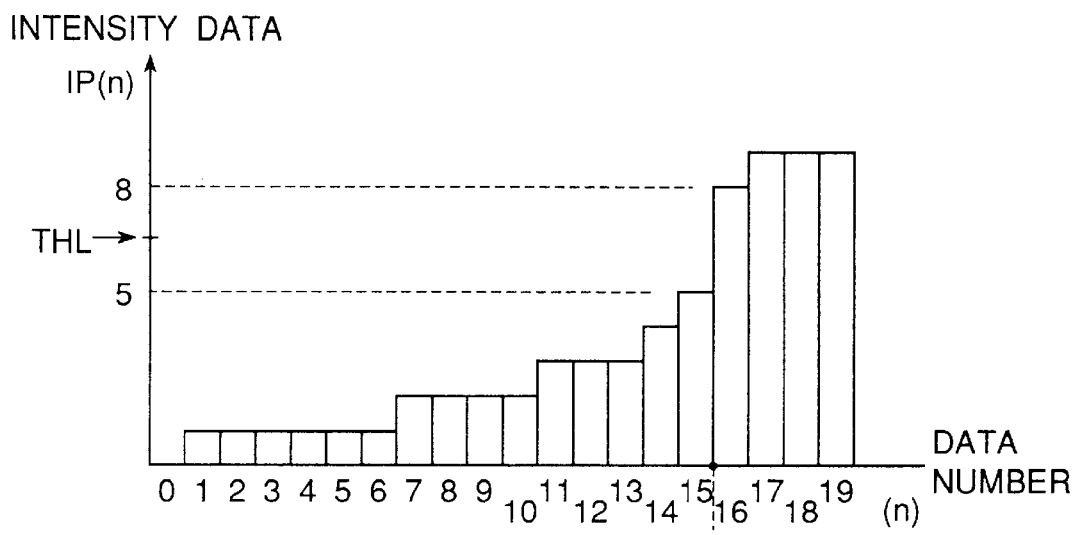
FIG. 20 is a graph showing a compressed intensity profile and a threshold value in the embodiment of the present invention.
Figure 21:
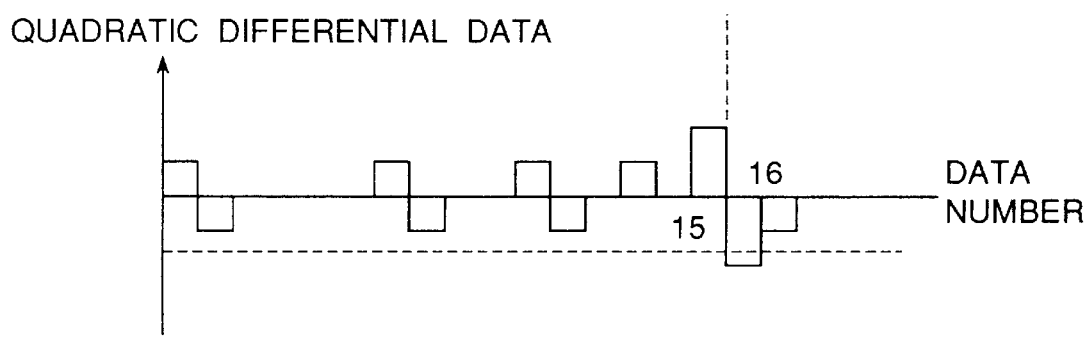
FIG. 21 is a graph showing an intensity data quadratic differential table of the compressed intensity profile and a threshold value in the embodiment of the present invention.
Figure 26:
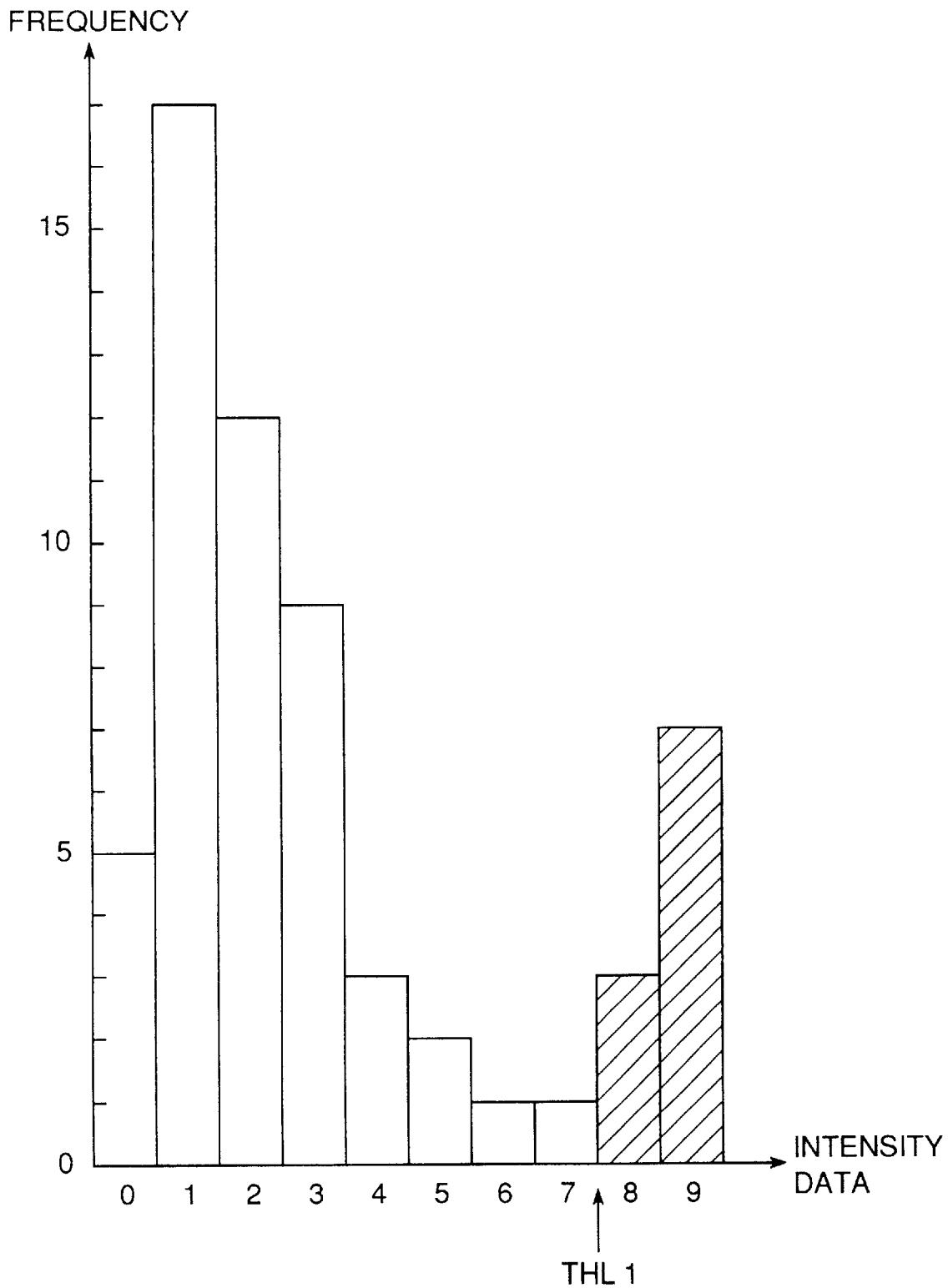
FIG. 26 is a graph showing intensity data of the conventional art.

FIG. 20 shows a compressed intensity profile formed according to the third embodiment from the conventional histogram shown in FIG. 26. FIG. 21 shows a result obtained by quadratically differentiating the compressed intensity profile shown in FIG. 20. According to FIGS. 20 and 21, two intensity data of 5 and 8 corresponding to the data number of 15 and the data number of 16 are obtained, consequently obtaining a threshold value of 6.5 by averaging the two intensity data as described above.

Figure 22:
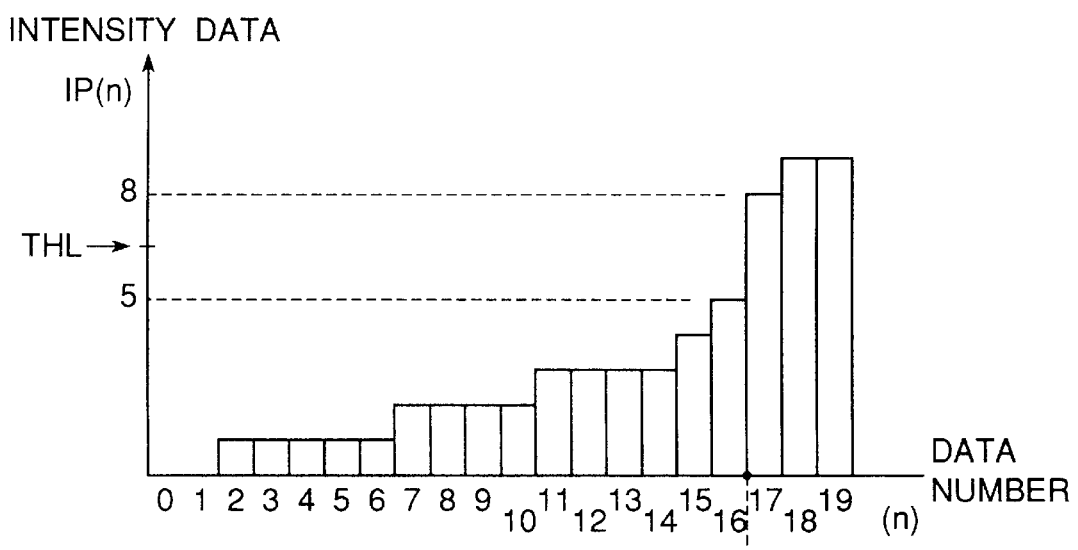
FIG. 22 is a graph showing a compressed intensity profile and a threshold value in the embodiment of the present invention.
Figure 23:
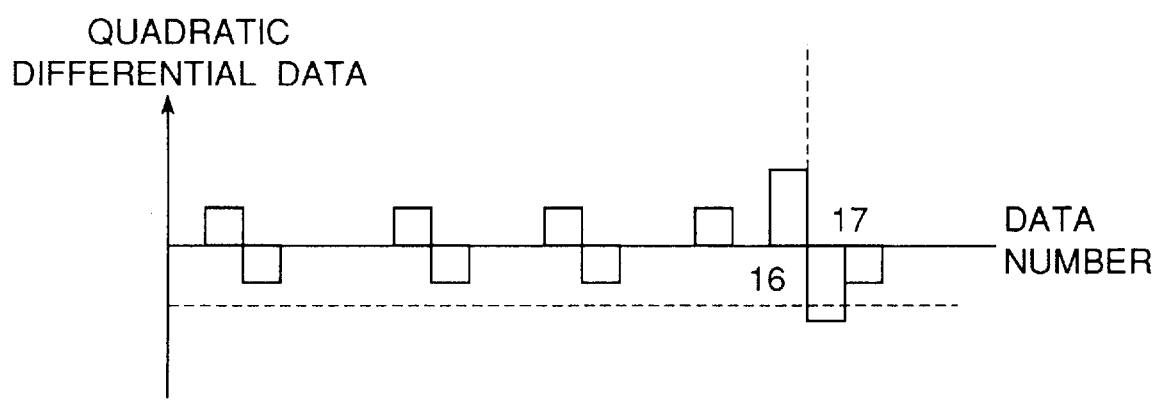
FIG. 23 is a graph showing an intensity data quadratic differential table of the compressed intensity profile and a threshold value in the embodiment of the present invention.
Figure 28:
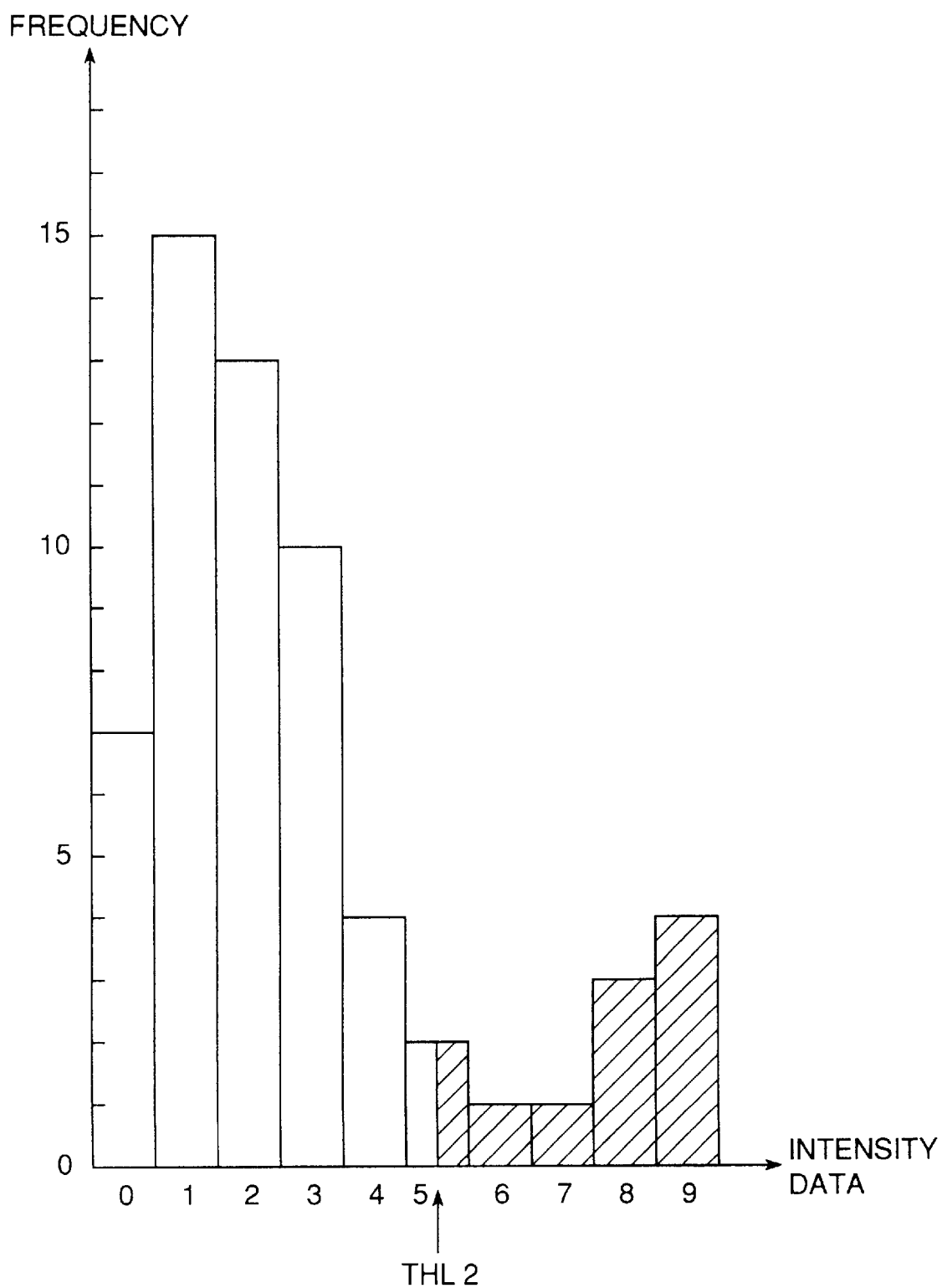
FIG. 28 is a graph showing intensity data and a threshold value of the conventional art.
Figure 29:
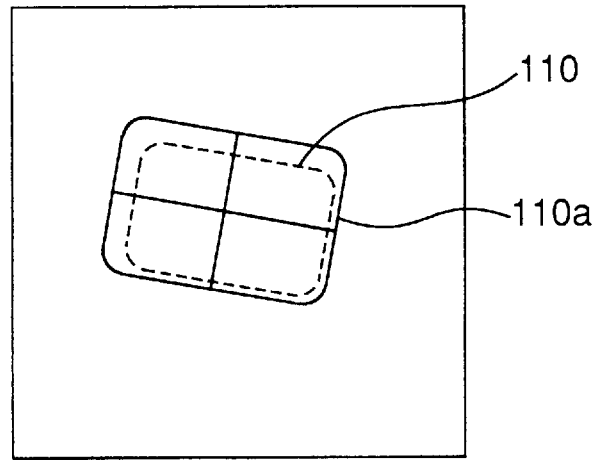
FIG. 29 is a diagram showing an error of an image recognition position of the conventional art.
Figure 30:
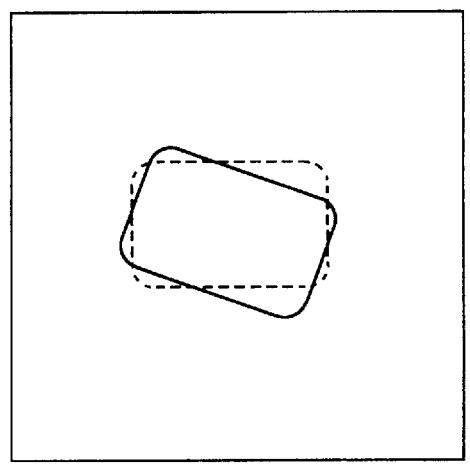
FIG. 30 is a diagram showing an image of an electronic component of the conventional art.

Further, FIG. 22 shows a compressed intensity profile formed according to the third embodiment from the conventional histogram shown in FIG. 28. FIG. 23 shows a result obtained by quadratically differentiating the compressed intensity profile shown in FIG. 22. According to FIGS. 22 and 23, two intensity data of 5 and 8 corresponding to the data number of 15 and the data number of 16 are obtained, consequently obtaining a threshold value of 6.5 by calculating two intensity data.

According to the conventional art in which a threshold value is obtained from the absolute value of the intensity data, the threshold value obtained from the histogram shown in FIG. 26 in which the electronic component that is the object to be recognized is not dirty is 7.5, while the threshold value obtained from the histogram shown in FIG. 28 in which the electronic component that is the object to be recognized is dirty is 5.0, proving a significant difference.

The above fact tells that the first to third embodiments of the present invention, which calculate the threshold value based on the quadratic differential of the intensity profile corresponding to the original pattern formed by the object to be recognized and the background, is capable of consistently calculating the appropriate threshold value since the original pattern remains though the gray level changes even when the electronic component that is the object to be recognized is dirty or the brightness of the background fluctuates.

The component detecting method and apparatus of the first and fifth aspects of the present invention produce the effect that the appropriate threshold value can be calculated so that no bad influence is exerted on the position detection result of the object to be recognized even when reflection of light from the object to be recognized is reduced by the stain of the object, or the intensity of the background changes more or less depending on illuminating conditions.

The component detecting method and apparatus of the second and sixth aspects of the present invention produce the effect that the processing speed can be increased while maintaining the recognition accuracy.

The component detecting method and apparatus of the third and seventh aspects of the present invention produce the effect that the processing speed can be increased while maintaining the recognition accuracy.

Furthermore, the fourth and eighth aspects of the present invention produce the effect that the possible occurrence of an error due to noise can be prevented.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

We claim:

1. A component detecting method for detecting an image of a component from a background with a threshold value, the method comprising:

an image digitizing process for digitizing an image signal of a component to be recognized and storing a digitized image signal as two-dimensional image data comprised of an intensity signal into an image data storing part;

an intensity data sampling process for sampling intensity data in an intensity data sampling area for sampling the intensity data in the two-dimensional image data and storing sampled data into an intensity data storing part;

an intensity profile forming process for forming an intensity profile obtained by rearranging the intensity data stored in the intensity data storing part in an order of increasing values of the intensity data;

an intensity profile quadratic differential process for forming an intensity data quadratic differential table by quadratically differentiating the intensity data (IP(n)) in the intensity profile with respect to a data number n corresponding to the intensity data;

a zero-crossing point detecting process for detecting, from the intensity data quadratic differential table, a data number corresponding to a zero-crossing point at which adjacent quadratic differential data obtained by quadratically differentiating the intensity data (IP(n)) are changed between positive and negative through zero; and a threshold value calculating process for determining a threshold value according to an intensity data of the data number corresponding to the zero-crossing point, so as to detect the image of the component from a background with the calculated threshold value.

2. A component detecting method for detecting an image of a component from a background with a threshold value as claimed in claim 1, wherein in the zero-crossing point detecting process, the data number and another data number adjacent the data number are detected as corresponding to the zero-crossing point, and in the threshold value calculating process, the threshold value is calculated by averaging intensity data of the two data numbers.

3. A component detecting method for detecting an image of a component from a background with a threshold value as claimed in claim 1, further comprising: an intensity data table compressing process provided after the intensity data sampling process and before the intensity profile forming process, wherein in the intensity data table compressing process, when a total number of the intensity data stored in the intensity data storing part is not smaller than a predetermined specific value, every two adjacent intensity data of the intensity data are sequentially compared with each other and a compressed intensity data obtained by abandoning a smaller one of the compared intensity data and taking a greater one of the compared intensity data is stored into the intensity data storing part, and then compressed intensity data are used in subsequent processes.

4. A component detecting method for detecting an image of a component from a background with a threshold value, the method comprising:

an image digitizing process for digitizing an image signal of a component to be recognized and storing a digitized image signal as two-dimensional image data comprised of an intensity signal into an image data storing part;

an intensity histogram forming process for forming an intensity histogram by sampling intensity data in an intensity data sampling area set on the two-dimensional image data;

a data compression ratio calculating process for calculating a data compression ratio R in compressing the intensity histogram into a compressed intensity histogram having a number $N_{LIM}$ of data in maximum according to an equation (1):

$$R=[N/N_{LIM}]+1 \qquad (1)$$

where N is a number of the intensity data, and $[N/N_{LIM}]$ is a maximum integer of a calculated result in this division; and a compressed intensity profile forming process for forming a compressed intensity profile by successively reading a frequency H(i) of i-th in the intensity histogram for an initial value of i (where i is a number of the intensity data);

successively calculating a cumulative value S(i+1) of the frequency H(i) according to an equation (2):

$$S(i+1)=S(i)+H(i) \text{ (wherein } S(0)=0) \qquad (2),$$

determining whether or not the S(i+1) is less than R in every calculation of the equation (2), and repeating, if the S(i+1) is not less than R, calculation of an equation (3) until the S(i+1) is less than R:

$$S(i+1) \leftarrow S(i+1) - R \qquad (3)$$
$$IP(n) = i$$
$$n \leftarrow n + 1;$$

an intensity profile quadratic differential process for forming an intensity data quadratic differential table by quadratically differentiating the intensity data (IP(n)) in the compressed intensity profile with respect to a data number n corresponding to the intensity data;

a zero-crossing point detecting process for detecting, from the intensity data quadratic differential table, a data number corresponding to a zero-crossing point at which adjacent quadratic differential data obtained y quadratically differentiating the intensity data (IP(n)) are changed between positive and negative through zero; and a threshold value calculating process for determining a threshold value according to an intensity data of the data number corresponding to the zero-crossing point. so as to detect the image of the component from a background with the calculated threshold value.

5. A component detecting method for detecting an image of a component from a background with a threshold value as claimed in claim 1, wherein the threshold value is calculated according to the intensity data of the data number corresponding to a negative quadratic differential data which is smaller than a preset reference value.

6. A component detecting method for detecting an image of a component from a background with a threshold value as claimed in claim 3, wherein the threshold value is calculated according to the intensity data of the data number corresponding to a negative quadratic differential data which is smaller than a preset reference value.

7. A component detecting method for detecting an image of a component from a background with a threshold value as claimed in claim 4, wherein the threshold value is calculated according to the intensity data of the data number corresponding to a negative quadratic differential data which is smaller than a preset reference value.

8. A component detecting apparatus for detecting an image of a component from a background with a threshold value, the apparatus comprising:

an image data storing part for storing a digitized image signal of the component to be recognized as two-dimensional image data comprised of an intensity signal;

an intensity data storing part for storing intensity data in an intensity data sampling area for sampling the intensity data in the two-dimensional image data;

an intensity profile forming part for forming an intensity profile obtained by rearranging the intensity data stored in the intensity data storing part in an order of increasing values of the intensity data;

an intensity profile quadratic differential part for forming an intensity data intensity data quadratic differential table by quadratically differentiating the intensity data (IP(n)) in the intensity profile with respect to a data number n corresponding to the intensity data;

a zero-crossing point detecting part for detecting, from the intensity data quadratic differential table, a data number corresponding to a zero-crossing point at which adjacent quadratic differential data obtained by quadratically differentiating the intensity data (IP(n)) are changed between positive and negative through zero; and a threshold value calculating part for determining a threshold value according to an intensity data of the data number corresponding to the zero-crossing point, so as to detect the image of the component from a background with the calculated threshold value.

9. A component detecting apparatus for detecting an image of a component from a background with a threshold value as claimed in claim 8, wherein in the zero-crossing point detecting part, the data number and another data number adjacent the data number are detected as corresponding to the zero-crossing point, and in the threshold value calculating part, the threshold value is calculated by averaging intensity data of the two data numbers.

10. A component detecting apparatus for detecting an image of a component from a background with a threshold value as claimed in claim 8, further comprising: an intensity data table compressing part, wherein in the intensity data table compressing part, when a total number of the intensity data stored in the intensity data storing part is not smaller than a predetermined specific value, every two adjacent intensity data of the intensity data are sequentially compared with each other and a compressed intensity data obtained by abandoning a smaller one of the compared intensity data and taking a greater one of the compared intensity data is stored into the intensity data storing part, and then compressed intensity data are used in the intensity profile forming part.

11. A component detecting apparatus for detecting an image of a component from a background with a threshold value, the apparatus comprising:

an image data storing part for storing a digitized image signal of the component to be recognized as two-dimensional image data comprised of an intensity signal;

an intensity histogram forming part for forming an intensity histogram by sampling an intensity data in an intensity data sampling area set on the two-dimensional image data;

a data compression ratio calculating part for calculating a data compression ratio R in compressing the intensity histogram into a compressed intensity histogram having a number $N_{LIM}$ of data in maximum according to an equation (1):

$$R=[N/N_{LIM}]+1 \qquad (1)$$

where N is the number of the intensity data, and $[N/N_{LIM}]$ is a maximum integer of a calculated result in this division; and a compressed intensity profile forming process for forming a compressed intensity profile by successively reading a frequency H(i) of i-th in the intensity histogram for an initial value of i (where i is a number of the intensity data);

successively calculating a cumulative value S(i+1) of the frequency H(i) according to an equation (2):

$$S(i+1)=S(i)+H(i) \text{ (wherein } S(0)=0) \qquad (2),$$

determining whether or not the S(i+1) is less than R in every calculation of the equation (2), and repeating, if the S(i+1) is not less than R, calculation of an equation (3) until the S(i+1) is less than R:

$$\begin{aligned} S(i+1) &\leftarrow S(i+1) - R \\ IP(n) &= i \\ n &\leftarrow n + 1; \end{aligned} \qquad (3)$$

an intensity profile quadratic differential part for forming an intensity data intensity data quadratic differential table by quadratically differentiating the intensity data (IP(n)) in the compressed intensity profile with respect to a data number n corresponding to the intensity data;

a zero-crossing point detecting part for detecting, from the intensity data quadratic differential table, a data number corresponding to a zero-crossing point at which adjacent quadratic differential data obtained by quadratically differentiating the intensity data (IP(n)) are changed between positive and negative through zero; and a threshold value calculating part for determining a threshold value according to an intensity data of the data number corresponding to the zero-crossing point, so as to detect the image of the component from a background with the calculated threshold value.

12. A component detecting apparatus for detecting an image of a component from a background with a threshold value as claimed in claim 8, wherein the threshold value is calculated according to the intensity data of the data number corresponding to a negative quadratic differential data which is smaller than a preset reference value.

13. A component detecting apparatus for detecting an image of a component from a background with a threshold value as claimed in claim 10, wherein the threshold value is calculated according to the intensity data of the data number corresponding to a negative quadratic differential data which is smaller than a preset reference value.

14. A component detecting apparatus for detecting an image of a component from a background with a threshold value as claimed in claim 11, wherein the threshold value is calculated according to the intensity data of the data number corresponding to a negative quadratic differential data which is smaller than a preset reference value.

* * * * *